US008174650B2

(12) United States Patent
Sakai et al.

(10) Patent No.: US 8,174,650 B2
(45) Date of Patent: May 8, 2012

(54) LIQUID CRYSTAL DISPLAY DEVICE HAVING FIRST AND SECOND BIREFRINGENT LAYERS AND FIRST AND SECOND QUARTER-WAVE PLATES

(75) Inventors: Akira Sakai, Osaka (JP); Kazuyoshi Sakuragi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/863,854

(22) PCT Filed: Nov. 28, 2008

(86) PCT No.: PCT/JP2008/071698
§ 371 (c)(1),
(2), (4) Date: Jul. 21, 2010

(87) PCT Pub. No.: WO2009/125515
PCT Pub. Date: Oct. 15, 2009

(65) Prior Publication Data
US 2010/0289988 A1    Nov. 18, 2010

(30) Foreign Application Priority Data

Apr. 7, 2008   (JP) .................. 2008-099526

(51) Int. Cl.
    *G02F 1/1335*   (2006.01)
(52) U.S. Cl. ........ 349/119; 349/117; 349/118; 349/120; 349/121
(58) Field of Classification Search ........... 349/117–121
    See application file for complete search history.

(56) References Cited

U.S. PATENT DOCUMENTS
6,195,140 B1   2/2001   Kubo et al.
(Continued)

FOREIGN PATENT DOCUMENTS
EP    1 072 926 A1    1/2001
(Continued)

OTHER PUBLICATIONS

Supplementary EP Search Report mailed Feb. 23, 2011 in EP application 08873807.5.

(Continued)

*Primary Examiner* — Jessica M Merlin
(74) *Attorney, Agent, or Firm* — Nixon & Vanderhye P.C.

(57) ABSTRACT

The present invention provides an LCD device that has a higher contrast ratio in a wide viewing angle and that can be easily produced at low cost. The present invention is a liquid crystal display device, including in the following order:
  a first polarizer;
  a first birefringent layer;
  a first quarter-wave plate;
  a liquid crystal cell;
  a second quarter-wave plate;
  a second birefringent layer; and
  a second polarizer having an absorption axis orthogonal to an absorption axis of the first polarizer,
wherein the first birefringent layer satisfies Nz>0.9 and has an in-plane slow axis orthogonal to the absorption axis of the first polarizer;
the first quarter-wave plate has an in-plane slow axis forming an angle of about 45° with the absorption axis of the first polarizer;
the liquid crystal cell displays a black screen by aligning liquid crystal molecules in the liquid crystal cell vertically to a substrate surface;
the second quarter-wave plate has an in-plane slow axis orthogonal to the in-plane slow axis of the first quarter-wave plate; and
the second birefringent layer satisfies Nz<0.1 and has an in-plane slow axis parallel to the absorption axis of the second polarizer.

7 Claims, 17 Drawing Sheets

U.S. PATENT DOCUMENTS

| | | |
|---|---|---|
| 6,295,109 B1 | 9/2001 | Kubo et al. |
| 6,330,047 B1 | 12/2001 | Kubo et al. |
| 2001/0020991 A1 | 9/2001 | Kubo et al. |
| 2001/0048497 A1 | 12/2001 | Miyachi et al. |
| 2001/0055082 A1 | 12/2001 | Kubo et al. |
| 2003/0067574 A1 | 4/2003 | Sasaki et al. |
| 2003/0071952 A1 | 4/2003 | Yoshida et al. |
| 2004/0004681 A1 | 1/2004 | Ozawa et al. |
| 2004/0105059 A1 | 6/2004 | Ohyama et al. |
| 2004/0156001 A1 | 8/2004 | Moriya |
| 2005/0018118 A1 | 1/2005 | Kubo et al. |
| 2005/0219447 A1 | 10/2005 | Slaney et al. |
| 2005/0225706 A1 | 10/2005 | Miyachi et al. |
| 2005/0231660 A1 | 10/2005 | Fujita et al. |
| 2005/0270455 A1 | 12/2005 | Kubo et al. |
| 2006/0139539 A1* | 6/2006 | Chen et al. .................. 349/129 |
| 2006/0187387 A1 | 8/2006 | Ohyama et al. |
| 2006/0187388 A1 | 8/2006 | Ohyama et al. |
| 2006/0203160 A1 | 9/2006 | Moriya |
| 2006/0203162 A1 | 9/2006 | Ito et al. |
| 2007/0002227 A1 | 1/2007 | Kubo et al. |
| 2007/0019138 A1 | 1/2007 | Kubo et al. |
| 2007/0064177 A1* | 3/2007 | Itadani et al. ................ 349/98 |
| 2007/0076152 A1* | 4/2007 | Ito et al. .................... 349/117 |
| 2007/0115411 A1 | 5/2007 | Ozawa et al. |
| 2007/0159585 A1 | 7/2007 | Yoshida et al. |
| 2007/0165165 A1 | 7/2007 | Joten |
| 2007/0195237 A1 | 8/2007 | Kubo |
| 2008/0049178 A1 | 2/2008 | Kisara et al. |
| 2008/0192182 A1* | 8/2008 | Kajita et al. .................. 349/96 |
| 2008/0212001 A1 | 9/2008 | Ozawa et al. |
| 2009/0219472 A1 | 9/2009 | Fujita et al. |
| 2009/0225263 A1 | 9/2009 | Miyachi et al. |
| 2011/0051061 A1 | 3/2011 | Sakai et al. |

FOREIGN PATENT DOCUMENTS

| | | |
|---|---|---|
| EP | 2 083 290 A1 | 7/2009 |
| JP | 2000-29010 | 1/2000 |
| JP | 2000-35570 | 2/2000 |
| JP | 2002/40428 | 2/2002 |
| JP | 2002-55342 | 2/2002 |
| JP | 2003-186017 | 7/2003 |
| JP | 2003/207782 | 7/2003 |
| JP | 2003-322857 | 11/2003 |
| JP | 2004-4494 | 1/2004 |
| JP | 2004-240102 | 8/2004 |
| JP | 2005-513241 | 5/2005 |
| JP | 2005-326818 | 11/2005 |
| JP | 2006-323069 | 11/2006 |
| WO | WO 2007/063629 | 6/2007 |

OTHER PUBLICATIONS

International Search Report for PCT/JP2008/071698, mailed Jan. 6, 2009.

Supplementary EP Search Report mailed Feb. 23, 2011 in EP application 09873807.5.

EP Search Report mailed Feb. 23, 2011 in EP application 10008685.9.

International Search Report for PCT/JP2008/067313, mailed Oct. 28, 2008.

* cited by examiner (a)

(b)

(a)

(b)

(a)

(b)

(a)

(b)

LIQUID CRYSTAL DISPLAY DEVICE HAVING FIRST AND SECOND BIREFRINGENT LAYERS AND FIRST AND SECOND QUARTER-WAVE PLATES

This application is the U.S. national phase of International Application No. PCT/JP2008/071698 filed 28 Nov. 2008, which designated the U.S. and claims priority to JP Application No. 2008-099526 filed 7 Apr. 2008, the entire contents of each of which are hereby incorporated by reference.

TECHNICAL FIELD

The present invention relates to liquid crystal display (LCD) devices, and more particularly relates to circularly-polarizing plate-including VA (vertical alignment) LCD devices.

BACKGROUND ART

LCD devices are widely used as display devices for various data-processing devices such as computers and televisions. In particular, TFT LCD devices (hereinafter, also referred to as "TFT-LCD") become popular, and expansion of the TFT-LCD market is expected. Such a situation creates a demand for much improved image quality.

Although the present description employs the TFT-LCD as an example, the present invention may be applicable to general LCDs such as passive matrix LCDs and plasma address LCDs, in addition to the TFT-LCDs.

The most widely used mode in the TFT-LCDs currently is a mode in which a liquid crystal having positive dielectric anisotropy is horizontally aligned between parallel substrates, namely, the TN mode. In a TN LCD device, the alignment direction of LC molecules adjacent to one substrate is twisted by 90° to that of LC molecules adjacent to the other substrate. Such TN LCD devices are now produced at low cost and have been industrially mature, while they are less likely to achieve a higher contrast ratio.

In addition, there are known LCD devices having another mode in which a liquid crystal having negative dielectric anisotropy is aligned vertically to parallel substrates, namely the VA LCD devices. In the VA LCD devices, LC molecules are aligned almost vertically to the surfaces of the substrates when no voltage is applied. Here, the liquid crystal (LC) cell hardly shows birefringence and optical rotation, and light passes through the LC cell while hardly changing in its polarization state. Thus, in the case of the arrangement such that the LC cell is interposed between two polarizers (linear polarizers) absorption axes of which are orthogonal to each other (also referred to as cross-Nicol polarizers), it is possible to display an almost perfectly black screen when no voltage is applied. When a voltage is applied, the LC molecules are made to be almost parallel to the substrates, and the LC cell shows large birefringence, and the LCD device displays a white screen. Thus, such a VA LCD device easily achieves a very high contrast ratio.

The VA LCD devices show asymmetric viewing angle characteristics when LC molecules are all aligned in the same direction in the presence of an applied voltage. In view of this, for example, MVA (multi-domain VA) LCD devices, which are one kind of the VA LCD devices, are now being widely used. According to the MVA LCD devices, the LC molecules are aligned in multiple directions by a structurally-modified pixel electrode or an alignment control member such as a protrusion formed in a pixel. The MVA LCD devices are ordinarily so designed that an axial azimuth of a polarizer makes an angle of 45° with respect to an alignment azimuth of LC molecules in the presence of an applied voltage in order to maximize the transmittance in white display state. This is because the transmittance of a light beam passing through a birefringent medium interposed between the cross-Nicole polarizers is proportional to $\sin^2(2\alpha)$ where $\alpha$ (unit:rad) is an angle made by the axis of the polarizer and a slow axis of the birefringent medium. In typical MVA LCD devices, the LC molecules can be aligned separately in four domains, or at azimuths of 45°, 135°, 225°, and 315°. Also in the four-domain VA LCD devices, LC molecules are often aligned in Schlieren texture or in undesired directions near at a domain boundary or near the alignment control member. This is one factor causing loss of transmittance.

In view of these circumstances, circularly-polarizing plate-including VA LCD devices are provided as disclosed in Patent Documents 1 to 3, for example. According to the LCD devices, the transmittance of a light beam passing through a birefringent medium interposed between a right-circularly-polarizing plate and a left-circularly-polarizing plate orthogonal to each other is independent on an angle made by the axis of the polarizer and the slow axis of the birefringent medium. Therefore, a desired transmittance can be secured as long as the tilt angle of the LC molecules can be controlled, even if the alignment azimuth is not 45°, 135°, 225°, and 315°. Accordingly, a conical protrusion may be disposed at the center of a pixel, thereby aligning the LC molecules at every azimuth, or alternatively the LC molecules may be tilted at random azimuths without any control of the alignment azimuth, for example. In the present description, the VA LCD devices including circularly-polarizing plates are referred to as CPVA LCD devices or CP LCD devices. In addition, VA LCD devices including linearly-polarizing plates are referred to as LPVA LCD devices or LP LCD devices. As is well known, the circularly-polarizing plate is typically composed of a combination with a linearly-polarizing plate and a quarter-wave plate.

Common CPVA LCD devices have a low contrast ratio as viewed in oblique directions and can not show sufficient viewing angle characteristics. In this point, the CPVA LCD devices have room for improvement. In view of this, technologies involving use of retardation films for improving the viewing angle characteristics have been proposed. For example, Patent Documents 1, 2, and 3 disclose the following methods (A), (B), and (C), respectively.
(A) Use of two quarter-wave plates satisfying nx>ny>nz
(B) Combination use of a quarter-wave plate satisfying nx>nz>ny and a retardation film (so-called negative C plate) satisfying nx=ny>nz
(C) Use of one or two half-wave plates satisfying nx>nz>ny in addition to the configuration in (B)
[Patent Document 1]
Japanese Kokai Publication No. 2002-40428
[Patent Document 2]
Japanese Kokai Publication No. 2003-207782
[Patent Document 3]
Japanese Kokai Publication No. 2003-186017

DISCLOSURE OF THE INVENTION

As a result of the inventors' studies, it was found that the methods (A) and (B) still have room for improvement in viewing angle characteristics. In addition, the methods (B) and (C) involve use of biaxial retardation films of nx>nz>ny (0<Nz<1), which are expensive and hard to produce. In this point, there is still room for improvement in the methods (B) and (C).

The present invention is devised considering the aforementioned situations. An object of the present invention is to provide an LCD device that has a higher contrast ratio in a wide viewing angle and that can be easily produced at low cost.

The inventors made various investigations on LCD devices that have a higher contrast ratio in a wide viewing angle and that can be easily produced at low cost, and then noted retardation conditions of birefringent layers disposed between a pair of polarizers (first and second polarizers) disposed in cross-Nicol. Then, the inventors found that the orthogonality between the first and second polarizers in oblique directions can be maintained while the orthogonality therebetween in the front direction is maintained when a first birefringent layer satisfying Nz>0.9, preferably Nz≧1.0 (satisfying nx>ny≧nz) and a second birefringent layer satisfying Nz<0.1, preferably Nz≦0.0 (satisfying nx<ny≦nz) are properly disposed between the first and second polarizers. The inventors also found that unlike the biaxial retardation film satisfying nx>nz>ny (0<Nz<1), materials with appropriate intrinsic birefringence are used to produce the first and second birefringent layers easily. Thus, the present inventors have found the solution of the aforementioned problems and arrived at the present invention.

The present invention relates to a liquid crystal display device, including in the following order:
 a first polarizer;
 a first birefringent layer;
 a first quarter-wave plate;
 a liquid crystal cell;
 a second quarter-wave plate;
 a second birefringent layer; and
 a second polarizer having an absorption axis orthogonal to an absorption axis of the first polarizer,
 wherein the first birefringent layer satisfies Nz>0.9 and has an in-plane slow axis orthogonal to the absorption axis of the first polarizer;
 the first quarter-wave plate has an in-plane slow axis forming an angle of about 45° with the absorption axis of the first polarizer;
 the liquid crystal cell displays a black screen by aligning liquid crystal molecules in the liquid crystal cell vertically to a substrate surface;
 the second quarter-wave plate has an in-plane slow axis orthogonal to the in-plane slow axis of the first quarter-wave plate; and
 the second birefringent layer satisfies Nz<0.1 and has an in-plane slow axis parallel to the absorption axis of the second polarizer.

The following will describe the present invention in detail.

The LCD device of the present invention includes, in the following order, a first polarizer, a first birefringent layer, a first quarter-wave plate, an LC cell, a second quarter-wave plate, a second birefringent layer, and a second polarizer having an absorption axis orthogonal to that of the first polarizer. The term "polarizer" herein represents an element which converts natural light into linearly polarized light and is synonymous with polarizing plate or polarizing film. Typically, a PVA (polyvinyl alcohol) film with a dichroic anisotropic material such as an iodine complex adsorbed and aligned thereon may be employed as the polarizer. Usually, a protective film such as a triacetyl cellulose (TAC) film is laminated on the respective sides of the PVA film to secure mechanical strength, moisture resistance, heat resistance, and the like, and the resulting laminated film is practically used. Unless otherwise specified, the term "polarizer" herein means the element with the polarization function alone, not including the protective films. The first and second polarizers are so designed that one constitutes a polarizer (a back-side polarizer) and the other constitutes an analyzer (a viewing-side polarizer). The LCD device of the present invention may include, in the following order, the first polarizer, the first birefringent layer, the first quarter-wave plate, the LC cell, the second quarter-wave plate, the second birefringent layer, and the second polarizer having the absorption axis orthogonal to the absorption axis of the first polarizer when the substrate surface of the LC cell is viewed in plane. It is preferable that the absorption axis of the first polarizer forms an angle of 90° with the absorption axis of the second polarizer when the substrate surface of the LC cell is viewed in plane in order that the LCD device can display a substantially complete black screen to provide a high contrast ratio in the front direction. However, the angle may slightly deviate from 90° as long as the viewing angle is compensated without reduction in the contrast ratio in the front direction. Specifically, the advantageous effects of the present invention can be sufficiently exhibited when the absorption axis of the first polarizer and the absorption axis of the second polarizer form an angle within 90°±1° (89° to 91°) as the substrate surface of the LC cell is viewed in plane. In the LCD device of the present invention, the respective components (the first polarizer, the first birefringent layer, the first quarter-wave plate, the LC cell, the second quarter-wave plate, the second birefringent layer, the second polarizer, and the like) may be just stacked one above another, but preferably fixedly stacked one above another to prevent misalignment of the optic axes thereof. The stacking method is not especially limited, and appropriate methods such as use of adhesive, cohesive and the like with excellent in transparency can be employed. The kind of the adhesive, cohesive and the like is not especially limited, but materials showing substantially no optical anisotropy are preferable. The adhesive, cohesive, and the like preferably can be cured or dried without high-temperature processes and also preferably cured or dried in a short-period of time so as not to change optical characteristics of the circularly-polarizing plates.

The LC cell generally includes a pair of substrates and an LC layer therebetween. The LC cell of the present invention is in a VA (vertical alignment) mode where a black screen is displayed by aligning LC molecules in the LC cell vertically to the substrate surface. The VA mode includes MVA (multi-domain VA) mode, CPA (continuous pinwheel alignment) mode, PVA (patterned VA) mode, EVA (biased vertical alignment), and Reverse TN mode, and the like. Thus, the LC cell of the present invention may not be one capable of aligning the LC molecules just vertically to the substrate surface, and may be one capable of substantially vertically aligning the LC molecules thereto or providing the LC molecules with a pretilt angle. The LC cell may be one capable of aligning the LC molecules vertically to the substrate surface in the absence of an applied voltage.

The LCD device of the present invention includes the first birefringent layer, the first quarter-wave plate, the second quarter-wave plate, and the second birefringent layer between the first and second polarizers. The term "birefringent layer" herein represents a layer having optical anisotropy, and is synonymous with retardation film, retardation plate, optically anisotropic layer, birefringent medium, and the like. The term "quarter-wave plate" herein represents an optically-anisotropic layer giving a retardation of about ¼ wavelength (exactly 137.5 nm, but larger than 115 nm and smaller than 160 nm) at least to a light beam at 550 nm wavelength, and is synonymous with λ/4 retardation film or λ/4 retardation plate.

The LCD device of the present invention displays a black screen in the following mechanism. A light beam that has entered the first polarizer from the normal direction (front direction) is converted into a linearly-polarized light beam by the first polarizer and passes through the first birefringent layer, maintaining its polarization state. Then when passing through the first quarter-wave plate, the linearly-polarized light beam is converted into a circularly-polarized light beam and passes through the LC cell, maintaining its polarization state. Then, when passing through the second quarter-wave plate, the circularly-polarized light beam is converted again into a linearly-polarized light beam and passes through the second birefringent layer, maintaining its polarization state, and finally, the linearly-polarized light beam is blocked by the second polarizer. Thus, the first and second birefringent layers are not meant to give a retardation to an incident light beam from the normal direction.

In oblique directions, the angle made by the absorption axes of the first and second polarizers is apparently different from that in the front direction. This apparent difference in the angle is compensated by retardations of the first and second birefringent layers. Specifically, the first and second birefringent layers are meant to give a retardation only to a light beam incident from oblique directions, thereby compensating the viewing angle characteristics.

As mentioned above, the first and second birefringent layers of the present invention allow that the orthogonality between the first and second polarizers in oblique directions can be provided while that in the front direction is maintained. As a result, the LCD device with an improved contrast ratio in the oblique directions and excellent viewing angle characteristics can be provided.

The LCD device of the present invention is not especially limited as log as it includes the first polarizer, the first birefringent layer, the first quarter-wave plate, the LC cell, the second quarter-wave plate, the second birefringent layer, and the second polarizer as components, and may or may not include other components.

The above-mentioned display principle in the present invention can be achieved when the respective components of the present invention are as follows.

The first birefringent layer satisfies $Nz>0.9$ and has an in-plane slow axis orthogonal to the absorption axis of the first polarizer. The term "Nz coefficient" is defined as $Nz=(nx-nz)/(nx-ny)$, where the principal refractive index of a birefringent layer (including an LC cell or a quarter-wave plate) in the in-plane direction is nx and ny ($nx>ny$) and the principal refractive index thereof in the out-of-plane direction (in the thickness direction) is nz. The wavelength for the measurements of the principal refractive index, the retardation, and the like optical characteristics herein is 550 nm unless otherwise mentioned.

Even in the case of birefringent layers each having the same Nz coefficient, difference in the average refractive indices $(nx+ny+nz)/3$ of the birefringent layers causes difference in effective retardations of the birefringent layers to incident light from oblique directions due to refractive angles. Thus, the design principle becomes complicated. In order to avoid this problem, the average refractive index of each birefringent layer is herein standardized to 1.5 for Nz coefficient calculation, unless otherwise mentioned. For the birefringent layer having an actual average refractive index of not 1.5, the value is converted assuming that the average refractive index is 1.5. The below-mentioned retardation Rxz is also standardized in the same manner.

When the first birefringent layer has an Nz coefficient of smaller than 1.0, it satisfies $nx>nz>ny$ to possibly become hard to produce. In contrast to this, generally, birefringent layers satisfying $1.0 \leq Nz$ can be easily produced by common methods (for example, by uniaxial transverse stretching or biaxial transverse and longitudinal stretching). However, in production of birefringent layers satisfying $1.0 \leq Nz$, birefringent layers of Nz=about 0.9 happen to be prepared. Thus the first birefringent layer satisfying $Nz>0.9$ can be easily prepared. It is more preferable that the first birefringent layer satisfies $1.1 \leq Nz \leq 4.0$. The first birefringent layer satisfying $1.1 \leq Nz \leq 4.0$ is easier to produce because it can be produced by a common uniaxial transverse stretching or biaxial transverse and longitudinal stretching and typically by using materials with positive intrinsic birefringence. In view of this, the first birefringent layer preferably includes a material with positive intrinsic birefringence. When a material with positive intrinsic birefringence is used to prepare the first birefringent layer satisfying $1.1 \leq Nz \leq 4.0$ by the above-mentioned stretching, the in-plane slow axis can be made to be at 90° with respect to (orthogonal to) the longitudinal direction of a roll-liked retardation film, and so roll-to-roll processing can be employed for attachment of the first birefringent layer to the first polarizer. Also in this point, it is preferable that the material with positive intrinsic birefringence is used to produce the first birefringent layer satisfying $1.1 \leq Nz \leq 4.0$. Polarizing films that are PVA films with a dichroic anisotropic material such as an iodine complex adsorbed and aligned thereon are a typically roll-liked polarizer having an absorption axis in parallel to its longitudinal direction, and they can be attached to the first birefringent layer so that the in-plane slow axis of the first birefringent layer makes an angle of 90° with respect to (orthogonal to) the absorption axis of the first polarizer by roll-to-roll processing. The first birefringent layer may satisfy $Nz>0.9$ and may have an in-plane slow axis orthogonal to the absorption axis of the first polarizer when the substrate surface of the LC cell is viewed in plane.

The second birefringent layer satisfies $Nz<0.1$ and has an in-plane slow axis parallel to the absorption axis of the second polarizer. When the second birefringent layer has an Nz coefficient of larger than 0.0, it satisfies $nx>nz>ny$ to possibly become hard to produce. In contrast to this, generally, birefringent layers satisfying $Nz \leq 0.0$ can be easily produced by common methods (for example, by uniaxial transverse stretching or biaxial transverse and longitudinal stretching). However, in production of birefringent layers satisfying $Nz \leq 0.0$, birefringent layers of Nz=about 0.1 happen to be prepared. Thus the second birefringent layer satisfying $Nz<0.1$ can be easily prepared. It is more preferable that the second birefringent layer satisfies $-3.0 \leq Nz \leq -0.1$. The second birefringent layer satisfying $-3.0 \leq Nz \leq -0.1$ is easier to produce because it can be produced by common biaxial transverse and longitudinal stretching and typically by using materials with negative intrinsic birefringence. In view of this, the second birefringent layer preferably includes a material with negative intrinsic birefringence. When a material with negative intrinsic birefringence is used to prepare the second birefringent layer satisfying $-3.0 \leq Nz \leq -1.0$ by the above-mentioned stretching, the in-plane slow axis can be made to be at 0° with respect to (parallel to) the longitudinal direction of a roll-liked retardation film, and so roll-to-roll processing can be employed for attachment of the second birefringent layer to the second polarizer. Also in this point, it is preferable the material with negative intrinsic birefringence is used to produce the second birefringent layer satisfying $-3.0 \leq Nz \leq -1.0$. The second birefringent layer may satisfy $Nz<0.1$ and may have an in-plane slow axis parallel to the absorption axis of the second polarizer when the substrate surface of the LC cell is viewed in plane.

In order to achieve a higher contrast ratio in a wide viewing angle range (a viewing-angle compensation) without reduction in the contrast ratio in the front direction, as mentioned above, the in-plane slow axis of the first birefringent layer and the absorption axis of the first polarizer are basically required to form an angle of 90° and the in-plane slow axis of the second birefringent layer and the absorption axis of the second polarizer are basically required to form an angle of 0°. This is because as follows.

In order to maintain the contrast ratio in the front direction, it is required to (1) disable the birefringent layer in the front direction. In order to compensate the viewing angle, it is required to (2) enable the birefringent layer in oblique directions.

In order to satisfy the condition (1), the birefringent layers and the polarizers are required to satisfy either of the following axial relationships: (a) the optic axis of the polarizer 1 and the optic axis of the birefringent layer 2 are parallel when viewed from the front direction (FIG. 1(a)); and (b) the optic axis of the polarizer 1 and the optic axis of the birefringent layer 2 are orthogonal when viewed from the front direction (FIG. 2(a)).

The term "optic axis" herein does not represent the optic axis strictly used in crystal optics, and is defined as follows. Assuming that the average value of the three principal refractive indices of the birefringent layer is calculated and then the difference between each principal refractive index and the average value is calculated, the principal axis which corresponds to the principal refractive index having the maximum magnitude of the difference is the "optic axis" herein. Thus, an optically biaxial birefringent layer has not two but a single "optic axis." As mentioned here, the "optic axis" of the biaxial birefringent layer corresponds to the optic axis of the conventional definition when it is optically approximated to a uniaxial birefringent layer.

In order to satisfy the condition (2), the axes are required to satisfy not the relationship (a) but the relationship (b). This is because as follows.

When light is incident into a laminate of the polarizers 1 and the birefringent layers 2 from an oblique direction, the birefringent layer 2 shows substantially no contribution in the oblique direction in the case that the effective transmission axis of the polarizer 1 viewed from the oblique direction is parallel to one of the vibrating directions in the two eigenmodes of vibration of the birefringent layer 2 (the vibrating direction of the electrical potential displacement vector D) to the incident light from the oblique direction. That is, in order to enable the birefringent layer 2 in the oblique direction, the effective transmission axis of the polarizer 1 viewed from the oblique direction is required to be neither parallel nor perpendicular to the vibrating direction in the eigenmodes of polarization of the birefringent layer.

In the case that the optic axis of the polarizer 1 and the optic axis of the birefringent layer 2 are parallel as in the condition (a), the effective transmission axis of the polarizer 1 is parallel to one vibrating direction in the two eigenmodes of vibration of the birefringent layer 2 viewed from any direction, as shown in FIG. 1(b). Thus, the birefringent layer 2 is disabled. In contrast, in the case that the optic axis of the polarizer 1 and the optic axis of the birefringent layer 2 are orthogonal as in the condition (b), the effective transmission axis of the polarizer 1 is neither parallel nor orthogonal to the vibrating direction in the eigenmodes of polarization of the birefringent layer 2 viewed from oblique directions, as shown in FIG. 2(b). Thus, the birefringent layer 2 is enabled.

The polarizer in the present invention preferably includes a PVA film with a dichroic anisotropic material such as an iodine complex adsorbed and aligned thereon, what is called an O-type polarizer. The "O-type polarizer" herein absorbs light vibrating in a specific direction in the plane of the element (defined as the absorption axis), and transmits light vibrating in the direction orthogonal to the absorption axis in the plane of the element (defined as the transmission axis) and light vibrating in the normal direction of the element. That is, the O-type polarizer has one absorption axis and two transmission axes, and the optic axis of the O-type polarizer is along the absorption axis.

The first birefringent layer satisfying Nz=1.0 serves as a uniaxial birefringent layer and the in-plane fast axis thereof serves as the optic axis. Here, in the case that the first birefringent layer satisfies Nz>1.0 or 1.0>Nz>0.9, the optic axis thereof is parallel to the in-plane slow axis. Thus, the in-plane slow axis of the first birefringent layer and the absorption axis of the first polarizer preferably form an angle of 90° when the substrate surface of the LC cell is viewed in plane. The angle may slightly deviate from 90° as long as the viewing angle is compensated without reduction in the contrast ratio in the front direction. Specifically, the advantageous effects of the present invention can be sufficiently exhibited when the in-plane slow axis of the first birefringent layer and the absorption axis of the first polarizer form an angle within 90°±1° (89° to 91°) as the substrate surface of the LC cell is viewed in plane.

The second birefringent layer satisfying Nz=0.0 serves as a uniaxial birefringent layer and the axis orthogonal to the in-plane slow axis (the in-plane fast axis) thereof serves as the optic axis. Here, in the case that the second birefringent layer satisfies Nz<0.0 or 0.0<Nz<0.1, the optic axis thereof is parallel to the in-plane fast axis. Thus, the in-plane slow axis of the second birefringent layer and the absorption axis of the second polarizer are basically required to form an angle of 0°. The angle may slightly deviate from 0° as long as the viewing angle is compensated without reduction in the contrast ratio in the front direction. Specifically, the advantageous effects of the present invention can be sufficiently exhibited when the in-plane slow axis of the second birefringent layer and the absorption axis of the second polarizer form an angle within 0°±1° (−1° to 1°) as the substrate surface of the LC cell is viewed in plane.

The first quarter-wave plate has an in-plane slow axis forming an angle of about 45° with the absorption axis of the first polarizer, and the second quarter-wave plate has an in-plane slow axis orthogonal to the in-plane slow axis of the first quarter-wave plate. The first and second polarizers are disposed so that the absorption axes thereof are orthogonal to each other (in cross-Nicol), and so in other words, the second quarter-wave plate has an in-plane slow axis forming an angle of about 45° with the absorption axis of the second polarizer. Contributed to this arrangement between the first and second quarter-wave plates, a combination of the first polarizer and the first quarter-wave plate and a combination of the second polarizer and the second quarter-wave plate are designed that one combination serves as a left-hand circularly-polarizing plate and the other serves as a right-hand circularly-polarizing plate. As a result, a white screen with a high transmittance can be displayed. The in-plane slow axes of the first and second quarter-wave plates are orthogonal to each other, and so in a black screen, the retardations of the first and second quarter-wave plates are canceled, and the birefringence is hardly shown at least in the front direction. So in the front direction, an almost completely black screen can be displayed to provide a high contrast ratio. As mentioned above, in order to display a white screen with a high transmittance and an almost completely black screen, it is most preferable that the in-plane slow axes of the first and second quarter-wave plates form an angle of 45° (+45° or −45°) with the absorption axes of the first and second polarizers, respectively, but the angle may slightly deviate from 45° unless the contrast ratio in the front direction is reduced. Specifically, the advantageous effects of the present invention can be sufficiently obtained when the angle of the in-plane slow axis of the first quarter-wave plate with the absorption axis of the first polarizer and the angle of the in-plane slow axis of the second quarter-wave plate with the absorption axis of the second polarizer as the substrate surface of the LC cell is viewed in plane are each within 45°±2° (43° to 47°). Similarly, the advantageous effects of the present invention can be sufficiently obtained when the angle of the in-plane slow axis of the first quarter-wave plate with the in-plane slow axis of the second quarter-wave plate as the substrate surface of the LC cell is viewed in plane is within 90°±1° (89° to 91°).

Preferable embodiments of the LCD device of the present invention are mentioned in detail hereinbelow.

The preferable embodiments of the LCD device are classified as follows according to the difference between the degrees of biaxiality of the first and second birefringent layers. In the case of serving as a uniaxial birefringent layer, the first birefringent layer satisfies Nz=1, and the second birefringent layer satisfies Nz=0. Thus, the biaxial parameter ΔNz1 of the first birefringent layer is defined as |Nz−1|, and the biaxial parameter ΔNz2 of the second birefringent layer is defined as |Nz|. Here, the first birefringent layer satisfies Nz>0.9 and the second birefringent layer satisfies Nz<0.1. Thus, the LCD device satisfies ΔNz1≧0 and ΔNz2≧0. In this case, the preferable embodiments of the LCD device include (a) an embodiment satisfying ΔNz1=ΔNz2, (b) an embodiment satisfying ΔNz1<ΔNz2, and (c) an embodiment satisfying ΔNz1>ΔNz2. The "ΔNz1=ΔNz2" herein means that the difference between ΔNz1 and ΔNz2 is less than 0.2.

In the embodiment (a), the first and second birefringent layers have the same degree of biaxiality. According to this embodiment, provided can be LC displays with more symmetric viewing angle characteristics and a higher contrast ratio in a wide viewing angle range.

FIG. 3 and Table 1 show the relationship between ΔNz1 of the first birefringent layer and an optimum Rxy in the case that ΔNz1=ΔNz2 is satisfied (in the figure, "■" represents the first birefringent layer and "Δ" represents the second birefringent layer). The optimum Rxy is a value shown when the highest contrast ratio is given as the LCD device is viewed from a direction bisecting the angle formed by the absorption axes of the first and second polarizers. The "Rxy" herein is an in-plane retardation (unit: nm) defined by Rxy=(nx−ny)×d where the principal refractive index of a birefringent layer (including an LC cell or a quarter-wave plate) in the in-plane direction is nx and ny (nx≧ny); the principal refractive index thereof in the out-of-plane direction (in the thickness direction) is nz; and the thickness of the birefringent layer is d. The term "in-plane slow axis of the birefringent layer" herein represents the direction of principal dielectric axis (x-axis direction) corresponding to the principal refractive index nx. The below-mentioned Rxz is an out-of-plane (thickness-direction) retardation (unit: nm) defined by Rxz=(nx−nz)×d where the principle refractive index of a birefringent layer (including an LC cell or a quarter-wave plate) in the in-plane direction is nx and ny (nx≧ny); the principal refractive index thereof in the out-of-plane direction (in the thickness direction) is nz; and the thickness of the birefringent layer is d. The below-mentioned retardation Rio of the LC cell is defined by |Rxz|. The wavelength for the measurements of the principal refractive index, the retardation, and the like optical characteristics herein is 550 nm unless otherwise mentioned.

The values Rxy of the first and second birefringent layers are most preferably the optimum values shown in FIG. 3 and Table 1, respectively, in order to provide LC display with a high contrast ratio in a wide viewing angle range. However, the values may slightly deviate from the respective optimum values unless the contrast ratio in oblique directions is reduced. For sufficient advantageous effects of the invention, it is preferable that the values Rxy are within the optimum values±15 nm.

As shown in FIG. 3 and Table 1, the relationship between ΔNz1 of the first birefringent layer and the optimum Rxy is not simple typically, but in the case of 2.0≦Nz≦4.0 (1.0≦ΔNz1≦3.0), the following formula (1) gives a sufficiently close approximate value, which is shown by the line (solid line) in FIG. 3.

$$Rxy = (72 - 9.6 \times \Delta Nz1) \tag{1}$$

FIG. 3 and Table 1 show that in the case of 2.0≦Nz≦4.0 (1.0≦ΔNz1≦3.0), the values Rxy of the first and second birefringent layers are each preferably within 45 to 64 nm.

TABLE 1

| First birefringent layer Nz | Δ Nz1 | Second birefringent layer Nz | Δ Nz2 | First birefringent layer Rxy | Second birefringent layer Rxy |
|---|---|---|---|---|---|
| 1.0 | 0.0 | 0.0 | 0.0 | 92 | 92 |
| 1.1 | 0.1 | −0.1 | 0.1 | 87 | 87 |
| 1.2 | 0.2 | −0.2 | 0.2 | 83 | 83 |
| 1.3 | 0.3 | −0.3 | 0.3 | 80 | 80 |
| 1.4 | 0.4 | −0.4 | 0.4 | 77 | 77 |
| 1.5 | 0.5 | −0.5 | 0.5 | 74 | 74 |
| 2.0 | 1.0 | −1.0 | 1.0 | 64 | 64 |
| 2.2 | 1.2 | −1.2 | 1.2 | 61 | 61 |
| 2.3 | 1.3 | −1.3 | 1.3 | 60 | 60 |
| 2.8 | 1.8 | −1.8 | 1.8 | 54 | 54 |
| 3.0 | 2.0 | −2.0 | 2.0 | 53 | 53 |
| 3.3 | 2.3 | −2.3 | 2.3 | 50 | 50 |
| 3.5 | 2.5 | −2.5 | 2.5 | 48 | 48 |
| 4.0 | 3.0 | −3.0 | 3.0 | 45 | 45 |

In the embodiment (b), the first birefringent layer has a relatively low biaxial parameter and the second birefringent layer has a relatively high biaxial parameter. In this embodiment, the first birefringent layer requires a lower retardation Rxy as compared with the embodiment (a). Thus, LC display with a higher contrast ratio in a wide viewing angle range can be provided even if the first birefringent layer includes a material that is less likely to show a retardation.

FIG. 4 and Table 2 show the relationship between ΔNz2 and an optimum Rxy in the case that ΔNz1=0 and ΔNz2>0 are satisfied (in the figure, "■" represents the first birefringent layer and "Δ" represents the second birefringent layer). The optimum Rxy was a value shown when the highest contrast ratio is given as the LCD device is viewed from a direction bisecting the angle formed by the absorption axes of the first and second polarizers. The values Rxy of the first and second birefringent layers are most preferably the optimum values shown in FIG. 4 and Table 2, respectively, in order to provide LC display with a high contrast ratio in a wide viewing angle range. However, the values may slightly deviate from the respective optimum values unless the contrast ratio in oblique directions is reduced. For sufficient advantageous effects of the invention, it is preferable that the values Rxy are within the optimum values±15 nm. The present invention satisfies, but not limited to, ΔNz1=0 (Nz=1.0), and generally ΔNz1≧0 (Nz>0.9). The closer the value of ΔNz1 is to the value of ΔNz2, the closer the invention is to the embodiment (a) (ΔNz1=ΔNz2). Thus, in the embodiment (b), the optimum Rxy for each of ΔNz1 and ΔNz2 is presumably between the optimum. Rxy obtained from Table 1 and the optimum Rxy obtained from Table 2.

TABLE 2

| First birefringent layer Nz | Δ Nz1 | Second birefringent layer Nz | Δ Nz2 | First birefringent layer Rxy | Second birefringent layer Rxy |
|---|---|---|---|---|---|
| 1.0 | 0.0 | 0.0 | 0.0 | 92 | 92 |
| 1.1 | 0.1 | 0.0 | 0.0 | 83 | 96 |
| 1.2 | 0.2 | 0.0 | 0.0 | 75 | 100 |
| 1.3 | 0.3 | 0.0 | 0.0 | 70 | 103 |
| 1.4 | 0.4 | 0.0 | 0.0 | 64 | 106 |
| 1.5 | 0.5 | 0.0 | 0.0 | 60 | 108 |
| 2.0 | 1.0 | 0.0 | 0.0 | 45 | 116 |
| 2.2 | 1.2 | 0.0 | 0.0 | 40 | 118 |
| 2.3 | 1.3 | 0.0 | 0.0 | 39 | 119 |
| 2.8 | 1.8 | 0.0 | 0.0 | 32 | 123 |
| 3.0 | 2.0 | 0.0 | 0.0 | 29 | 124 |
| 3.3 | 2.3 | 0.0 | 0.0 | 27 | 125 |
| 3.5 | 2.5 | 0.0 | 0.0 | 25 | 126 |
| 4.0 | 3.0 | 0.0 | 0.0 | 22 | 127 |

In the embodiment (c), the first birefringent layer has a relatively high biaxial parameter and the second birefringent layer has a relatively low biaxial parameter. In this embodiment, the second birefringent layer requires a lower retardation Rxy as compared with the embodiment (a). Thus, LC display with a higher contrast ratio in a wide viewing angle range can be provided even if the second birefringent layer includes a material that is less likely to show a retardation.

FIG. 5 and Table 3 show the relationship between ΔNz1 and an optimum Rxy in the case that ΔNz2=0 and ΔNz1>0 are satisfied (in the figure, "■" represents the first birefringent layer and "△" represents the second birefringent layer). The optimum Rxy was a value shown when the highest contrast ratio is given as the LCD device is viewed from a direction bisecting the angle formed by the absorption axes of the first and second polarizers. The values Rxy of the first and second birefringent layers are most preferably the optimum values shown in FIG. 5 and Table 3, respectively, in order to provide LC display with a high contrast ratio in a wide viewing angle range. However, the values may slightly deviate from the respective optimum values unless the contrast ratio in oblique directions is reduced. For sufficient advantageous effects of the invention, it is preferable that the values Rxy are within the optimum values±15 nm. The present invention satisfies, but not limited to, ΔNz2=0 (Nz=0.0), and generally ΔNz2≧0 (Nz<0.1). The closer the value of ΔNz2 is to the value of ΔNz1, the closer the invention is to the embodiment (a) (ΔNz1=ΔNz2). Thus, in the embodiment (c), the optimum Rxy for each of ΔNz1 and ΔNz2 is presumably between the optimum Rxy obtained from Table 1 and the optimum Rxy obtained from Table 3.

TABLE 3

| First birefringent layer Nz | Δ Nz1 | Second birefringent layer Nz | Δ Nz2 | First birefringent layer Rxy | Second birefringent layer Rxy |
|---|---|---|---|---|---|
| 1.0 | 0.0 | 0.0 | 0.0 | 92 | 92 |
| 1.0 | 0.0 | −0.1 | 0.1 | 96 | 83 |
| 1.0 | 0.0 | −0.2 | 0.2 | 100 | 75 |
| 1.0 | 0.0 | −0.3 | 0.3 | 103 | 70 |
| 1.0 | 0.0 | −0.4 | 0.4 | 106 | 64 |
| 1.0 | 0.0 | −0.5 | 0.5 | 108 | 60 |

TABLE 3-continued

| First birefringent layer Nz | Δ Nz1 | Second birefringent layer Nz | Δ Nz2 | First birefringent layer Rxy | Second birefringent layer Rxy |
|---|---|---|---|---|---|
| 1.0 | 0.0 | −1.0 | 1.0 | 116 | 45 |
| 1.0 | 0.0 | −1.2 | 1.2 | 118 | 40 |
| 1.0 | 0.0 | −1.3 | 1.3 | 119 | 39 |
| 1.0 | 0.0 | −1.8 | 1.8 | 123 | 32 |
| 1.0 | 0.0 | −2.0 | 2.0 | 124 | 29 |
| 1.0 | 0.0 | −2.3 | 2.3 | 125 | 27 |
| 1.0 | 0.0 | −2.5 | 2.5 | 126 | 25 |
| 1.0 | 0.0 | −3.0 | 3.0 | 127 | 22 |

It is preferable that the biaxial parameter ΔNz1 of the first birefringent layer is substantially equal to the biaxial parameter ΔNz2 of the second birefringent layer in order that the orthogonality between the first and second polarizers is maintained well also in oblique directions and a higher contrast ratio can be provided in a wide viewing angle range, although the preferable embodiments of the present of the LCD device of the present invention have been mentioned with reference to the embodiments (a) to (c) classified according to the difference between the degrees of biaxiality of the first and second birefringent layers. According to this, the orthogonality between the first and second polarizers can be maintained well also in oblique directions, and so LCD devices with more symmetric viewing angle characteristics and a higher contrast ratio in a wide viewing angle range can be provided. From these viewpoints, it is more preferable that |ΔNz1−ΔNz2|≦0.4 is satisfied, and still more preferably |ΔNz1−ΔNz2|≦0.2 is satisfied, and particularly preferably |ΔNz1−ΔNz2|≦0.1.

The first birefringent layer preferably satisfies 2.0≦Nz≦4.0, more preferably 2.3≦Nz≦3.3. According to this, LCD devices with a higher contrast ratio in a wide viewing angle range can be produced at low cost. The reason for it is mentioned below.

Also in linearly-polarizing plate-including VA LCD devices (hereinafter referred to LPVA LCD devices), optical compensation involving use of retardation films for a higher contrast ratio in a wide viewing angle has been proposed so far. LPVA LCD devices including two biaxial retardation films for optical compensation have been practically used. The Nz coefficients and the designed values Rxy of the biaxial retardation films depend on a retardation of an LC cell, or Rlc=|Rxy|, but in the case of Rlc=290 to 370 nm, which is a retardation of a typical VA LC cell, 2.3≦Nz≦3.3 and 50 nm≦Rxy≦60 nm are satisfied and this corresponds to the first birefringent layer in the embodiment (a). Specifically, when also in the present invention, the retardation conditions of the first and second birefringent layers are adjusted within such a range of providing a high contrast ratio in a wide viewing angle, and the same retardation conditions as in the above-mentioned biaxial retardation film practically used in LPVA LCD devices can be adopted to the first birefringent layer, this is preferable in terms of use of members common to CPVA LCDs and LPVA LCDs and a reduction in costs. The above-mentioned biaxial retardation film is commonly used in large-sized TVs, and so it can be easily available at low cost. As a result of the inventors' studies, it was found that use of the biaxial retardation film satisfying the above-mentioned retardation conditions as the first birefringent layer of the present invention allows a high contrast ratio in a wide viewing angle. The principle of it is mentioned with reference to the Poincare sphere below.

The Poincare sphere is widely known in crystal optics as a useful approach for tracing of state of polarization of a light beam propagating through a birefringent layer (for example, see "Kessyo Kogaku", written by Takasaki Hiroshi, published by Morikita Publishing Co., Ltd., 1975, p. 146 to 163). On the Poincare sphere, right-handed polarized state is represented on the upper hemisphere; left-handed polarized state on the lower hemisphere, linear polarized state on the equator; right- and left-handed circular polarized states are on upper and lower poles, respectively. Between two polarization states symmetrical with respect to the center of the sphere, the ellipticity angles are the same in absolute value but opposite in polarity. This shows that the two polarization states are in the orthogonal polarization state. The effects attributed to the birefringent layer are shown on the Poincare sphere as follows. The point showing state of polarization of a light beam before propagating through a birefringent layer is rotated in a counterclockwise direction by an angle determined by (2π)× (retardation)/(wavelength) (unit:rad) around the slow axis (specifically, the point showing the polarization state of slower one of the two eigenmodes of vibration of a birefringent layer) (this is the same when the point is rotated in a clockwise direction around the fast axis). The rotation center and the rotation angle in an oblique view direction are determined by the slow axis and the retardation at the viewing angle. Although not being explained in detail, these can be calculated, for example, by determining a vibrating direction in the eigenmode of vibration and a wave vector in the birefringent layer from Fresnel equation for the normal incidence. The slow axis in an oblique view direction depends on a viewing angle, and en Hz coefficient defined by (nx−nz)/(nx−ny) or the above-defined biaxial parameters ΔNz1 and ΔNz2. The retardation in an oblique view direction depends on a viewing angle, the biaxial parameters ΔNz1 and ΔNz2, and the retardations Rxy and Rxz.

Below mentioned is the state of polarization of a light beam propagating through an LPVA LCD device where optical compensation is provided by two biaxial retardation films. The LPVA LCD device has, as shown in FIG. 6, a multi-layer structure composed of a first polarizer 11 (absorption axis azimuth of 90°), a first biaxial retardation film r1 (slow axis azimuth of 0°), a VA LC cell 31, a second biaxial retardation film r2 (slow axis azimuth of 90°), and a second polarizer (absorption axis azimuth of 0°). The LCD device of FIG. 6 is viewed from a direction with an azimuth angle (hereinafter, also referred to as an azimuth angle of 45°) bisecting an angle made by the absorption axis azimuth 90° of the first polarizer 11 and the absorption axis azimuth 0° of the second polarizer 12 and the direction inclined from the normal direction by 60° (hereinafter, also referred to as an inclination angle of 60°). The polarization state of a light beam output from a backlight (not shown, located below the first polarizer 11) at the output of the first polarizer 11 is represented by P0 on the Poincare sphere, and P0 does not correspond to E showing state of polarization the second polarizer 12 can absorb, i.e., extinction position (absorption axis azimuth) of the second polarizer 12. This is represented on S1-S2 plane of the Poincare sphere in FIG. 7(a) and, represented on S1-S3 plane thereof in FIG. 7(b). The points showing the respective polarization states are actually on the Poincare sphere, but these are projected on S1-S2 and S1-S3 planes, respectively.

P0 and E, which are on the S2 axis when the LCD device is viewed in the front direction (not shown), do not overlap with each other in the oblique direction with an azimuth angle of 45° and an inclination angle of 60°. Assuming that the LCD device excludes the VA LC cell 31 and the first and second biaxial retardation films r1 and r2, light leakage would occur in the oblique direction. In practice, however, the LCD device includes the VA LC cell 31 and the first and second biaxial retardation films r1 and r2, and so a light beam having passed through the first biaxial retardation film r1 changes its polarization state. So P0 is rotated by a specific angle around the slow axis of the first biaxial retardation film r1 represented by R1 on the Poincare sphere to reach P1. In this case, the rotation is in the counterclockwise direction when the coordinate origin O is viewed from R1. Then the light beam passes through the VA LC cell 31, and thereby P1 is rotated by a specific angle around the slow axis of the LC cell represented by LC on the Poincare sphere to reach P2. In this case, the rotation is in the counterclockwise direction when the coordinate origin O is viewed from LC. P2 is positioned on the south hemisphere of the Poincare sphere, and so P2 and the arrow showing pathway to P2 are each shown by the dotted line in FIG. 7(a). Finally, the light beam passes through the second biaxial retardation film r2, and thereby P2 is rotated by a specific angle around the slow axis of the second birefringent retardation film r2, represented by R2 (slow axis) on the Poincare sphere to finally reach P3. P3 corresponds to E. In this case, the rotation is in the counterclockwise direction when the coordinate origin O is viewed from R2. In FIG. 7(b) where the polarization state is represented on S1-S3 plane, the conversion from P2 to P3 is shown as clockwise-rotation around the fast axis of the second biaxial retardation film r2, represented by R2 (fast axis) on the Poincare sphere. Thus, the LCD device of FIG. 6 can block the light beam from the backlight also when viewed from the direction with an azimuth angle of 45° and an inclination angle of 60°, similarly when viewed in the front direction. Specifically, according to the LCD device of FIG. 6, the polarization state represented by P0 on the Poincare sphere is finally converted into that represented by E through P1 and P2 by using the three birefringent media, i.e., the first biaxial retardation film r1, the VA LC cell 31, and the second biaxial retardation film r2.

Then, mentioned is the case where instead of the VA LC cell 31 and the second biaxial retardation film r2, a biaxial retardation film r2' having a slow axis represented by R2' on the Poincare sphere is disposed. In this case, P1 is rotated around the slow axis of the biaxial retardation film r2', represented by R2' on the Poincare sphere, not in the clockwise direction but in the counterclockwise direction when the coordinate origin O is viewed from R2'. So P2' after the conversion can be made to correspond to E when a proper retardation Rxy is selected. The inventors' studies determined that the slow axis can be represented by R2' on the Poincare sphere in an oblique viewing direction with an azimuth angle of 45° and an inclination angle of 60° by disposing the second birefringent layer satisfying Nz<0.1 so that its in-plane slow axis forms an angle of 0° with the absorption axis of the second polarizer 12. The entire configuration in this case is shown in FIG. 8. Specifically, the multi-layer body of FIG. 8 is composed of the first polarizer 11 (absorption axis azimuth 90°), the first biaxial retardation film r1 (slow axis azimuth 0°), the second biaxial retardation film r2' (slow axis azimuth 0°), and the second polarizer 12 (absorption axis azimuth 0°). By use of the two birefringent media, i.e., the first biaxial retardation film r1 and the second biaxial retardation film r2', the polarization state represented by P0 on the Poincare sphere is finally converted into that represented by E through P1. This is the principle why the LCD device of the present invention can well maintain the orthogonality between the first and second polarizers even in the oblique direction. This is projected on S1-S2 plane on the Poincare sphere in FIG. 9(a) and projected on S1-S3 plane in FIG. 9(b). Thus, the same retardation conditions as in the above-mentioned biaxial retardation film practically used in LPVA LCDs can be employed to the first birefringent layer of the present invention. In addition, in order that P2' showing the final polarization state corresponds to E, it is more preferable that the biaxial parameter ΔNz1 of the first birefringent layer is made to be substantially equal to the biaxial parameter ΔNz2 of the second birefringent layer, whereby R2' and R1 are symmetrical with respect to S2 axis of the Poincare sphere. This is because the distance from R1 and S2 axis depends on ΔNz1 and the distance between R2' and S2 axis depends on ΔNz2, and further these distances are the same when ΔNz1=ΔNz2 is satisfied. In order that P2' showing the final polarization state corresponds to E, it is preferable that a retardation Rxy of the second birefringent layer is substantially the same as that of the first birefringent layer.

The above description relates to the case where a higher contrast ratio in a wide viewing angle range can be provided in the embodiment where any birefringent medium is not present between the first birefringent layer (corresponding to the above-mentioned first biaxial retardation film r1) and the second birefringent layer (corresponding to the above-mentioned second biaxial retardation film r2'). In practice, however, the LCD device of the present invention includes the first quarter-wave plate, the LC cell, and the second quarter-wave plate between the first and second birefringent layers. Also in this case, the same effects as in the case where no birefringent media are disposed can be obtained when in oblique directions influences of birefringence attributed to these birefringent media can be minimized.

From these viewpoints, it is preferable in the LCD device of the present invention that the Nz coefficients of the first and second quarter-wave plates are appropriately controlled. Further, it is preferable that the LCD device further includes a third birefringent layer satisfying Rxy≦10 nm and Rxz>0 nm between the first quarter-wave plate and the liquid crystal cell and/or between the Liquid crystal cell and the second quarter-wave plate. According to this, influences of the birefringence attributed to the LC layer and the first and second quarter-wave plates can be minimized in the oblique directions. As a result, the LCD device with a higher contrast ratio in a wide viewing angle range can be provided. When a retardation Rxy of the third birefringent layer is larger than 10 nm, the contrast ratio in the front direction might be reduced. In order to effectively achieve the advantageous effects of the present invention, the third birefringent layer is preferably disposed adjacent to the LC cell. The phrase "disposed adjacent to" herein means that no birefringent medium is disposed between the LC cell and the third birefringent layer. In one embodiment, for example, an isotropic film may be disposed between the third birefringent layer and the LC cell.

The optimum Rxz of the third birefringent layer (a sum of values Rxz when two or more third birefringent layers are disposed) is shown by the following formula (2) and depends on Nzq1, Nzq2, and Rlc where an Nz coefficient of the first quarter-wave plate is defined as Nzq1; an Nz coefficient of the second quarter-wave plate is defined as Nzq2; and a retardation Rlc of the LC cell is defined as |Rxz|. When a value of (Nzq1+Nzq2) is large, the optimum Rxz can be zero, which means that no third birefringent layer is needed.

$$Rxz = Rlc - 137.5 \times (Nzq1 + Nzq2 - 1) \quad (2).$$

It is most preferable that a retardation Rxz of the third birefringent layer is the optimum value satisfying the above formula (2) in view of providing an LCD device with a higher contrast ratio in a wide viewing angle range. However, the retardation Rxz may slightly deviate from the optimum value unless the contrast ratio in the oblique direction is reduced. The retardation Rxz is preferably within the optimum value±50 nm in view of obtaining sufficient advantageous effects of the present invention. The optimum retardation Rxz is calculated as follows.

Below mentioned is the case where an LCD device having the following configuration is viewed in a direction with an azimuth angle of 45° and an inclination angle of 60°. The LCD device has, as shown in FIG. 10, a multi-layer structure composed of a first polarizer 11 (absorption axis azimuth 90°), a first birefringent layer r1 (slow axis azimuth of 0°), a first quarter-wave plate q1 (slow axis azimuth of 135°), a VA LC cell 31, a third birefringent layer r3, a second quarter-wave plate q2 (slow axis azimuth of 45°), a second birefringent layer r2 (slow axis azimuth of 0°), and a second polarizer 12 (absorption axis azimuth of 0°). When viewed in the oblique direction, the location on the Poincare sphere of the slow axis Q1 of the first quarter-wave plate q1, the slow axis LC of the VA LC cell 31, the slow axis R3 of the third birefringent layer r3, the slow axis Q2 of the second quarter-wave plate q2 satisfies the relationship shown in FIG. 11. When the changes in the polarization state at the output of the respective birefringent media are taken as rotation and conversion of points on the Poincare sphere showing the polarization state, the conversions attributed to the respective birefringent media are all the same in rotation center but different from one another in the rotation direction and the rotation angle. The respective rotation angles are proportional to effective retardations each of the first quarter-wave plate q1, the VA LC cell 31, the third birefringent layer r3, and the second quarter-wave plate q2 in the above-mentioned oblique viewing direction. The respective effective retardations thereof are actually represented by the following formulae (3) to (6):

$$\Gamma q1(45,60) = 140 + 56.1 \times (Nzq1 - 0.5) \quad (3)$$

$$\Gamma lc(45,60) = 0.408 \times Rlc \quad (4)$$

$$\Gamma r3(45,60) = 0.408 \times Rxz \quad (5)$$

$$\Gamma q2(45,60) = 140 - 56.0 \times (Nzq2 - 0.5) \quad (6),$$

where an effective retardation of the first quarter-wave plate q1 in the oblique viewing direction is defined as Γq1 (45, 60), an effective retardation of the VA LC cell 31 in the oblique viewing direction as Γlc (45, 60), an effective retardation of the third birefringent layer r3 in the oblique viewing direction as Γr3 (45, 60), an effective retardation of the second quarter-wave plate q2 in the oblique viewing direction as Γq2 (45, 60). For simplification of calculation, the third birefringent layer r3 is assumed to satisfy Rxy=0 nm.

The LCD device is assumed to satisfy the following formula (7).

$$+\Gamma q1(45,60) - \Gamma lc(45,60) + \Gamma r3(45,60) - \Gamma q2(45,60) = 0 \quad (7)$$

In this case, a light beam emitted from a backlight (not shown, located below the first polarizer 11) passes through the first polarizer 11 and the first birefringent layer r1 successively and then is converted into the polarization state represented by P1 on the Poincare sphere, into that represented by P2 after passing through the first quarter-wave plate q1, into that represented by P3 after passing through the VA LC cell 31, into that represented by P4 after passing through the third birefringent layer r3, and finally into that represented by P5 after passing through the second quarter-wave plate q2. P5 showing the final polarization state corresponds to P1, and the final polarization state is not completely changed from that before incident on the first quarter-wave plate q1. This shows that as viewed at least in an oblique direction with an azimuth angle of 45° and an inclination angle of 60°, the LCD device in FIG. 10 is optically equivalent to the multi-layer body in FIG. 8 to provide a higher contrast ratio. Thus, the optimum retardation Rxz of the third birefringent layer is determined. Specifically, the formulae (3) to (6) are substituted into the formula (7) to lead to the formula (2). The positions of P2 to P5 in FIG. 11 depend on Rlc, Nzq1, and Nzq2, and FIG. 11 shows, as an example, the embodiment where Rlc=320 nm and Nzq1=Nzq2=1.0 are satisfied. For simply showing the conversion of the polarization state, the positions of the respective points are roughly shown and might not be accurate. For clarity of illustration, the arrows showing tracing from P2 to P5 are not shown.

Then, the following will mention the case where the LCD device is viewed in an oblique direction with an azimuth angle of 0° and an inclination angle of 60°. In the oblique direction, the positional relationship on the Poincare sphere among the slow axis Q1 of the first quarter-wave plate q1, the slow axis LC of the VA LC cell 31, the slow axis R3 of the third birefringent layer r3, and the slow axis Q2 of the second quarter-wave plate q2 is shown in FIG. 12. Unlike in the oblique direction with an azimuth angle of 45° and an inclination angle of 60°, in the oblique direction with an azimuth angle of 0° and an inclination angle of 60°, the positions of Q1 and Q2 depend on Nzq1 and Nzq2. FIG. 12 shows, as an example, the embodiment where Nzq1=Nzq2=1.0 is satisfied. The rotation center of the conversion attributed to the VA LC cell 31 and that of the conversion attributed to the third birefringent layer r3 are the same but different from the rotation center of the conversion attributed to the first quarter-wave plate q1 and that of the conversion attributed to the second quarter-wave plate q2. In this case, a light beam emitted from the backlight passes through the first polarizer 11 and the first birefringent layer r1 successively and is converted into the polarization state represented by P1 on the Poincare sphere (P1 corresponds to P0 because the first birefringent layer r1 has no influences in the oblique direction with an azimuth angle of 0° and an inclination angle of 60°), and then into that represented by P2 after passing through the first quarter-wave plate q1, into that represented by P3 after passing through the VA LC cell 31, into that represented by P4 after passing through the third birefringent layer r3, and into that represented by P5 after passing through the second quarter-wave plate q2. P5 showing the final polarization state does not always correspond to P1. Specifically, the LCD device in FIG. 10 is not necessarily optically equivalent to the multi-layer body in FIG. 8 and can not provide a sufficiently high contrast ratio in the oblique direction with an azimuth angle of 0° and an inclination angle of 60°. In FIG. 12, the positions of P2 to P5 depend on Rlc, Nzq1, and Nzq2. FIG. 12 shows, as an example, the embodiment where Rlc=320 nm, Nzq1=Nzq2=1.0 are satisfied. For simply showing the conversion of the polarization state, the positions of the respective points are roughly shown and might not be accurate.

In order to provide an LCD device that can show a higher contrast ratio also in the oblique direction with an azimuth angle of 0° and an inclination angle of 60° to achieve a higher contrast ratio in a wide viewing angle range, the first and second quarter-wave plates preferably satisfy $0.8 \leq Nzq1+Nzq2 \leq 1.2$, and more preferably $0.9 \leq Nzq1+Nzq2 \leq 1.1$, and still more preferably $Nzq1+Nzq2=1.0$. The reason for this is as follows.

When Nzq1+Nzq2=1.0 is satisfied, the slow axis Q1 of the first quarter-wave plate q1 and the slow axis Q2 of the second quarter-wave plate q2 on the Poincare sphere are always symmetrical with respect to the coordinate origin O regardless of the viewing direction. Further, in an oblique direction with any azimuth Φ and an inclination angle of 60°, an effective retardation Γq1 (Φ, 60) of the first quarter-wave plate q1 and an effective retardation Γq2 (Φ, 60) of the second quarter-wave plate q2 are almost the same. Based on the formula (2), for a higher contrast ratio in an oblique direction with an azimuth angle of 45° and an inclination angle of 60°, the optimum retardation Rxz of the third birefringent layer is the same as Rlc when Nzq1+Nzq2=1.0 is satisfied. Accordingly, when the LCD device satisfying Nzq1+Nzq2=1.0 is viewed from the direction with an azimuth angle of 0° and an inclination angle of 60°, the positional relationship on the Poincare sphere among the slow axis Q1 of the first quarter-wave plate q1, the slow axis LC of the VA LC cell 31, the slow axis R3 of the third birefringent layer r3, and the slow axis Q2 of the second quarter-wave plate q2 is shown in FIG. 13. The positions of Q1 and Q2 depend on Nzq1 and Nzq2. FIG. 13 shows, as an example, the embodiment where Nzq1=1.0 and Nzq2=0.0 are satisfied. The conversion attributed to the VA LC cell 31 and that attributed to the birefringent layer r3 are the same in the rotation center and the absolute value of the rotation angle, but the rotation angle is opposite in polarity. The conversion attributed to the first quarter-wave plate q1 and that attributed to the second quarter-wave plate q2 are the same in the rotation center and the absolute value of the rotation angle, but the rotation angle is opposite in polarity. In this case, a light beam emitted from the backlight passes through the first polarizer 11 and the first birefringent layer r1 successively and is converted into the polarization state represented by P1 on the Poincare sphere (P1 corresponds to P0 because the first birefringent layer r1 has no influences in the oblique direction with an azimuth angle of 0° and an inclination angle of 60°), and then into that represented by P2 after passing through the first quarter-wave plate q1, into that represented by P3 after passing through the VA LC cell 31, into that represented by P4 after passing through the third birefringent layer r3, and into that represented by P5 after passing through the second quarter-wave plate q2. P5 showing the final polarization state corresponds to P1, which shows that the final polarization state is not completely changed from that before incident on the first quarter-wave plate q1. Thus, the LCD device satisfying Nzq1+Nzq2=1.0 is optically equal to the multi-layer body in FIG. 8 to show a higher contrast ratio when viewed in the oblique direction with an azimuth angle of 0° and an inclination angle of 60°. In FIG. 13, the positions of P2 to P5 depend on Rlc, Nzq1, and Nzq2. FIG. 13 shows, as an example, the embodiment in which Rlc=320 nm, Nzq1=1.0, Nzq2=0.0 are satisfied. For simply showing the conversion of the polarization state, the positions of the respective points are roughly shown and might not be accurate.

In the present invention, the first birefringent layer is disposed on one side of the LC cell, and the second birefringent layer on the other side thereof. According to this configuration, the first birefringent layer can protect the first polarizer, and the second birefringent layer can protect the second polarizer. This obviates the need of disposing a TAC film, an isotropic film, and the like for protecting the polarizers, which results in production of a slim-profile and cost-effective LCD device. Use of the quarter-wave plate also as the protective film for the polarizer causes a problem in manufacturing in that roll-to-roll processing can not be employed because the absorption axis of the polarizer is required to form an angle of 45° with the in-plane slow axis of the quarter-wave plate.

When the first and second birefringent layers are both disposed on only one side of the LC cell, the first or second birefringent layer needs to be stretched in its longitudinal direction, thereby making its axis to be directed in the roll longitudinal direction at the time of roll-to-roll processing for attachment of the polarizer and the first and second birefringent layers. In this case, it becomes difficult to effectively use birefringent layers that are widely used in large-sized TVs.

EFFECT OF THE INVENTION

The LCD device of the present invention has a high contrast ratio in a wide viewing angle range and can be easily produced at low cost because it includes a pair of the first birefringent layer satisfying Nz>0.9 and the second birefringent layer satisfying Nz<0.1. Such an LCD device of the present invention can be preferably used in display devices such as a TV and a mobile device.

BEST MODE FOR CARRYING OUT THE INVENTION (Birefringent Layer)

With respect to the birefringent layers used in the present invention, materials and optical characteristics thereof are not especially limited. Examples of the materials include thin plates made of inorganic materials, stretched polymer films, and ones in which alignment of liquid crystalline molecules is fixed.

The method for forming the birefringent layers is not especially limited. The polymer films may be formed by solvent cast, melt extrusion, and the like. Alternatively, coextrusion may be employed to form a plurality of birefringent layers at a time. The polymer films may or may not be stretched as long as desired retardations can be exhibited. The stretching method is not especially limited. The polymer films may be stretched under tension between rolls, compressed and stretched between rolls, uniaxially stretched in a transverse direction with a tenter, or biaxially stretched in longitudinal and transverse directions. Alternatively, the polymer films may be specially stretched under the influence of contractile force of a thermo-shrinkable film. When the liquid crystalline materials are used, for example, liquid crystalline materials are applied on a base film with an alignment treatment-provided surface, and thereby fixing alignment of the liquid crystalline materials. The base film may not be provided with the alignment treatment or the coating may be separated from the base film after the alignment fixing to be transferred onto another film as long as the desired retardations are exhibited. Alternatively, the alignment of the LC materials may not be fixed. The same methods as in use of the liquid crystalline materials may be employed when non-crystalline materials are used. The following will in more detail describe the birefringent layers classified by types.

(First Birefringent Layer)

The first birefringent layer may include a material formed by stretching a film containing a component with positive intrinsic birefringence. The first birefringent layer may be composed of two or more birefringent layers stacked one above another, but preferably composed of a single layer (single film) in view of ease and cost-effectiveness of the production. Examples of the component with positive intrinsic birefringence include polycarbonate, polysulfone, polyether sulfone, polyethylene terephthalate, polyethylene, polyvinyl alcohol, norbornene, triacetyl cellulose, and diatyl cellulose.

(Second Birefringent Layer)

The second birefringent layer may include a material formed by stretching a film containing a component with negative intrinsic birefringence or one formed by stretching a film containing a component with positive intrinsic birefringence under the influence of contractile force of a thereto-shrinkable film. For simplification of the production method, one formed by stretching a film containing a component with negative intrinsic birefringence is preferable. The second birefringent layer may be composed of two or more birefringent layers stacked one above another, but preferably composed of a single layer (single film) in view of ease and cost-effectiveness of the production. Examples of the component with negative intrinsic birefringence include polystyrene, polyvinyl naphthalene, polyvinyl biphenyl, polyvinyl pyridine, polymethyl methacrylate, polymethyl acrylate, an N-substituted maleimide copolymer, fluorene skeleton-containing polycarbonate, and triacetyl cellulose (particularly with a small acetylation degree).

(Third Birefringent Layer)

The third birefringent layer may include a material formed by stretching a film containing a component with positive intrinsic birefringence, one coated with a liquid crystalline compound e.g. a cholesteric (chiral nematic) liquid crystal and a discotic liquid crystal, and one coated with a non-liquid crystalline compound including a polymer e.g. polyimide and polyamide. The third birefringent layer may be composed of two or more birefringent layers stacked one above another, but preferably composed of a single layer (single film) in view of ease and cost-effectiveness of the production.

(First and Second Quarter-Wave Plates)

The same materials as in the first to third birefringent layers may be appropriately used for the first and second quarter-wave plates. The first and second quarter-wave plates each may be composed of two or more birefringent layers stacked one above another, but preferably composed of a single layer (single film) in view of ease and cost-effectiveness of the production.

(Polarizer)

The polarizers may include a polyvinyl alcohol (PVA) film with a dichroic anisotropic material such as an iodine complex adsorbed and aligned thereon.

(LC Cell)

The LC cell is not especially limited as long as it can display a black screen by aligning LC molecules in the LC cell vertically to a substrate surface, and VA LC cells may be employed, for example. Examples of the VA LC cells include MVA, CPA, PVA, EVA, and Reverse TN LC cells. Examples of a driving system of the LC cell include TFT system (active matrix system), passive matrix system, and plasma address system. The LC cell has a configuration, for example, in which LCs are disposed between a pair of substrates each provided with electrodes and display is provided by voltage application between the electrodes.

(Method for Measuring Rxy, Rxz, Nz, nx, ny, and nz)

Rxy, Rxz, Nz, nx, ny, and nz were measured with a dual-rotating retarder polarimeter (Axo-scan, Axometrics, Inc.). Rxy was measured from the normal direction of the birefringent layer. Rxz, Nz, nx, ny, and nz were calculated by curve fitting with a known index ellipsoid. For the calculation, retardations of the birefringent layer were measured from the normal direction and the directions each with an inclination angle of $-50°$ to $50°$ from the normal direction. Azimuths of the inclinations each were made orthogonal to the in-plane slow axis. Rxz, Nz, nx, ny, and nz depend on the average refractive index=$(nx+ny+nz)/3$, which is given as the condition for the curve fitting calculation. Here, the average refractive index of each birefringent layer was set to 1.5. Even in the case of the birefringent layer having an actual average refractive index of not 1.5, the average refractive index was converted into 1.5.

(Method for Measuring Viewing Angle Dependence of Contrast of LCD Device)

The viewing angle dependence of contrast was measured with a viewing angle measuring apparatus (EZContrast 160, ELDIM). The light source was a backlight mounted on a LC TV (LC37-GH1, SHARP Corp.). Brightnesses upon displaying a white screen and a black screen were measured in the oblique direction with an azimuth angle of 45° and an inclination angle of 60°. The ratio thereof was regarded as CR (45, 60). Brightnesses upon displaying a white screen and a black screen were measured in the oblique direction with an azimuth angle of 0° and an inclination angle of 60°. The ratio thereof was regarded as CR (0, 60).

The present invention is mentioned in more detail showing embodiments but not limited to these embodiments.

Embodiment 1

FIG. 14 is a perspective view that schematically shows a structure of an LCD device of Embodiment 1.

As shown in FIG. 14, the LCD device of Embodiment 1 according to the present invention is a VA LCD device produced by stacking a TAC film 101, a first polarizer 111, a first birefringent layer 151, a first quarter-wave plate 181, a VA LC cell 131, a third birefringent layer 171, a second quarter-wave plate 182, a second birefringent layer 161, a second polarizer 112, and a TAC film 102 in this order.

The optical characteristics and axial designs of the birefringent films 151, 161, and 171, the quarter-wave plates 181 and 182, the polarizers 111 and 112, and the LC cell 131 of the present embodiment are as shown in Table 4.

Table 4 does not show the optical characteristics of the TAC films 101 and 102 disposed outside the polarizers 111 and 112 (the side closer to the LC cell is defined as the inside, and the side farther therefrom is defined as the outside) because the outside TAC films 101 and 102 have no influence on the optical characteristics of the LCD device if only they are transparent films. The same is applied to the following Embodiments, Comparative Embodiments, and Reference Embodiments. In each table, the axis of each of the birefringent layers 151, 161, and 171 and each of the quarter-wave plates 181 and 182 is defined by the azimuth angle of the in-plane slow axis, and the axis of each of the polarizers 111 and 112 is defined by the azimuth angle of the absorption axis. In each table, the name of the material of each of the birefringent layers 151, 161, and 171 is indicated by means of the following abbreviations.

NB: norbornene
PC: polycarbonate
PMMA: polymethylmethacrylate
NM: N-substituted maleimide copolymer
ChLC: cholesteric liquid crystal
PI: polyimide
TAC: triacetyl cellulose
Z: isotropic film Embodiments 2 and 3

The LCD devices of Embodiments 2 and 3 according to the present invention each are almost the same LCD device of Embodiment 1 except that the retardations Rxy and the Nz coefficients of the first and second birefringent layers 151 and 161 are changed. Table 4 shows the optical characteristics and axial designs of the birefringent films 151, 161, and 171, the quarter-wave plates 181 and 182, the polarizers 111 and 112, and the LC cell 131 of the present embodiments.

Embodiment 4

The LCD device of Embodiment 4 according to the present invention is almost the same LCD device of Embodiment 1 except that the Nz coefficients of the first and second quarter-wave plates 181 and 182 are changed. Table 4 shows the optical characteristics and axial designs of the birefringent films 151, 161, and 171, the quarter-wave plates 181 and 182, the polarizers 111 and 112, and the LC cells 131 of the present embodiment.

Embodiment 5

The LCD device of Embodiment 5 according to the present invention is almost the same LCD device of Embodiment 1 except that the material of the second birefringent layer 161 is changed. Table 4 shows the optical characteristics and axial designs of the birefringent films 151, 161, and 171, the quarter-wave plates 181 and 182, the polarizers 111 and 112, and the LC cell 131 of the present embodiment.

Embodiments 6 and 7

The LCD devices of Embodiments 6 and 7 according to the present invention each are almost the same LCD device of Embodiment 1 except that the material of the third birefringent layer 171 is changed. Table 4 shows the optical characteristics and axial designs of the birefringent films 151, 161, and 171, the quarter-wave plates 181 and 182, the polarizers 111 and 112, and the LC cells 131 of the present embodiments.

Embodiment 8

FIG. 15 is a perspective view that schematically shows the structure of the LCD device of Embodiment 8.

The LCD device of Embodiment 8 according to the present invention is almost the same LCD device of Embodiment 1 except that the retardations Rxz and the Nz coefficients of the first and second quarter-wave plates 181 and 182 are changed to negative values and that the third birefringent layer 171 is not used. Table 5 shows the optical characteristics and axial designs of the birefringent films 151 and 161, the quarter-wave plates 181 and 182, the polarizers 111 and 112, and the LC cell 131 of the present embodiment.

Embodiment 9

The LCD device of Embodiment 9 according to the present invention is almost the same LCD device of Embodiment 1 except that the retardation Rxz and the Nz coefficient of the second quarter-wave plate 182 are changed and that the retardation Rxz of the third birefringent layer 171 is changed. Table 6 shows the optical characteristics and axial designs of the birefringent films 151, 161, and 171, the quarter-wave plates 181 and 182, the polarizers 111 and 112, and the LC cell 131 of the present embodiment.

The LCD device of Embodiment 10 according to the present invention is almost the same LCD device of Embodiment 9 except that the materials of the second birefringent layer 161 and the second quarter-wave plate 182 are changed. Table 6 shows the optical characteristics and axial designs of the birefringent films 151, 161, and 171, the quarter-wave plates 181 and 182, the polarizers 111 and 112, and the LC cell 131 of the present embodiment.

Embodiment 11

The LCD device of Embodiment 11 according to the present invention is almost the same LCD device of Embodiment 9 except that the material of the third birefringent layer 171 is changed. Table 6 shows the optical characteristics and axial designs of the birefringent films 151, 161, and 171, the quarter-wave plates 181 and 182, the polarizers 111 and 112, and the LC cell 131 of the present embodiment.

Embodiment 12

FIG. 16 is a perspective view that schematically shows the structure of the LCD device of Embodiment 12.

The LCD device of Embodiment 12 is almost the same LCD device of Embodiment 7 except that instead of the third birefringent layer 171, two third birefringent layers 172 and 173 that are disposed with the LC cell therebetween are used. Table 7 shows the optical characteristics and axial designs of the birefringent films 151, 161, 172, and 173, the quarter-wave plates 181 and 182, the polarizers 111 and 112, and the LC cell 131 of the present embodiment.

Embodiment 13

FIG. 17 is a perspective view that schematically shows the structure of the LCD device of Embodiment 13.

The LCD device of Embodiment 13 is almost the same LCD device of Embodiment 11 except that instead of the third birefringent layer 171, two third birefringent layers 174 and 175 that are disposed with the LC cell therebetween are used. Table 7 shows the optical characteristics and axial designs of the birefringent films 151, 161, 174, and 175, the quarter-wave plates 181 and 182, the polarizers 111 and 112, and the LC cell 131 of the present embodiment.

Comparative Embodiment 1

FIG. 18 is a perspective view that schematically shows the structure of the LCD device of Comparative Embodiment 1.

As shown in FIG. 18, the LCD device of Comparative Embodiment 1 is a VA LCD device produced by stacking a TAC film 103, a first polarizer 113, a TAC film 105, a first quarter-wave plate 183, a VA LC cell 132, a second quarter-wave plate 184, a TAC film 106, a second polarizer 114, and a TAC film 104, in this order. Table 8 shows the optical characteristics and axial designs of the TAC films 105 and 106, the quarter-wave plates 183 and 184, and the polarizers 113 and 114, and the LC cell 132 of the present comparative embodiment. The quarter-wave plates 183 and 184 of the present comparative embodiment satisfy nx>ny>nz. In the LCD device of the present comparative embodiment, the symmetrical viewing angle characteristics in the horizontal direction were not obtained when the absorption axis azimuth of the first polarizer 113 was designed to 90°, and so it was redesigned to 70°. This asymmetry in the viewing angle characteristics is considered to be caused because the birefringent medium between the first and second polarizers 113 and 114 has circular birefringence (optical rotation) largely depending on a viewing angle.

Comparative Embodiment 2

FIG. 19 is a perspective view that schematically shows a structure of an LCD device of Comparative Embodiment 2.

As shown in FIG. 19, the LCD device of Comparative Embodiment 2 is a VA LCD device produced by stacking a TAC film 103, a first polarizer 115, a TAC film 105, a first quarter-wave plate 185, a VA LC cell 132, a third birefringent layer 176, a second quarter-wave plate 186, a TAC film 106, a second polarizer 116, and a TAC film 104, in this order. Table 8 shows the optical characteristics and axial designs of the TAC films 105 and 106, the quarter-wave plates 185 and 186, and the polarizers 115 and 116, and the LC cell 132 of the present comparative embodiment. The quarter-wave plates 185 and 186 of the present comparative embodiment satisfy nx>nz>ny.

Comparative Embodiment 3

FIG. 20 is a perspective view that schematically shows a structure of an LCD device of Comparative Embodiment 3.

As shown in FIG. 20, the LCD device of Comparative Embodiment 3 is a VA LCD device produced by stacking a TAC film 103, a first polarizer 115, an isotropic film 191, a half-wave plate (HWP) 201, a first quarter-wave plate 187, a VA LC cell 132, a third birefringent layer 177, a second quarter-wave plate 188, an isotropic film 192, a second polarizer 116, and a TAC film 104, in this order. Table 8 shows the optical characteristics and axial designs of the third birefringent layer 177, the half-wave plate 201, the quarter-wave plates 187 and 188, the polarizers 115 and 116, and the LC cell 132 of the present comparative embodiment. The quarter-wave plates 187 and 188 and the half-wave plate 201 of the present comparative embodiment satisfy nx>nz>ny.

Comparative Embodiment 4

FIG. 21 is a perspective view that schematically shows a structure of an LCD device of Comparative Embodiment 4.

As shown in FIG. 21, the LCD device of Comparative Embodiment 4 is a VA LCD device produced by stacking a TAC film 107, a first polarizer 117, a first biaxial retardation film r4, a VA LC cell 133, a second biaxial retardation film r5, a second polarizer 118, and a TAC film 108, in this order. Table 9 shows the optical characteristics and axial designs of the biaxial retardation films r4 and r5, the polarizers 117 and 118, and the LC cell 133. The LCD device of the present comparative embodiment is an LPVA LCD device.

Comparative Embodiments 5 and 6

The LCD devices of Comparative Embodiments 5 and 6 are almost the same LCD device of Comparative Embodiment 4 except that the retardations Rxy and the Nz coefficients of the biaxial retardation films r4 and r5, and the retardation Rlc of the LC cell are changed. Table 9 shows the optical characteristics and axial designs of the biaxial retardation films r4 and r5, the polarizers 117 and 118, and the LC cell 133 of the present embodiment.

(Evaluation Results)

The LCD devices in the respective Embodiments and Comparative Embodiments were determined for viewing angle dependence of contrast, and the CR (45, 60) and the CR (0, 60) were shown in Tables 4 to 9.

The LCD device in each of Embodiments 1 to 13 according to the present invention had a CR (45, 60) higher than that in each of Comparative Embodiments 1 and 2. Even in the visual evaluation, the LCD device in each of Embodiments 1 to 13 had viewing angle dependence of contrast lower than that in each of Comparative Embodiments 1 and 2. The LCD device of Comparative Embodiment 3 also had low viewing angle dependence of contrast but includes three biaxial retardation films satisfying nx>nz>ny, which are hard to produce. Further, the LCD devices of Comparative Embodiments 4 to 6 had low viewing angle dependence of contrast but had a brightness on a white screen lower than that in each of Embodiments 1 to 13 by about 15% because they are LPVA LCD devices.

TABLE 4

| | Optical components | Material | Angle [°] | Retardation [nm] Rxy | Retardation [nm] Rxz or Rlc | Nz coefficient | Evaluation results CR (45, 60) | Evaluation results CR (0, 60) |
|---|---|---|---|---|---|---|---|---|
| Embodiment 1 | Second polarizer | | 0 | | | | 55 | 60 |
| | Second birefringent layer | PMMA | 0 | 55 | −100 | −1.8 | | |
| | Second quarter-wave plate | NB | 45 | 138 | 139 | 1.0 | | |
| | Third birefringent layer | NB | | 2 | 230 | | | |
| | VA liquid crystal cell | | | | 320 | | | |
| | First quarter-wave plate | NB | 135 | 138 | 139 | 1.0 | | |
| | First birefringent layer | NB | 0 | 55 | 154 | 2.8 | | |
| | First polarizer | | 90 | | | | | |
| Embodiment 2 | Second polarizer | | 0 | | | | 57 | 61 |
| | Second birefringent layer | PMMA | 0 | 55 | −75 | −1.4 | | |
| | Second quarter-wave plate | NB | 45 | 138 | 139 | 1.0 | | |
| | Third birefringent layer | NB | | 2 | 230 | | | |
| | VA liquid crystal cell | | | | 320 | | | |
| | First quarter-wave plate | NB | 135 | 138 | 139 | 1.0 | | |
| | First birefringent layer | NB | 0 | 55 | 132 | 2.4 | | |
| | First polarizer | | 90 | | | | | |
| Embodiment 3 | Second polarizer | | 0 | | | | 57 | 62 |
| | Second birefringent layer | PMMA | 0 | 80 | −26 | −0.3 | | |
| | Second quarter-wave plate | NB | 45 | 138 | 139 | 1.0 | | |
| | Third birefringent layer | NB | | 2 | 230 | | | |
| | VA liquid crystal cell | | | | 320 | | | |
| | First quarter-wave plate | NB | 135 | 138 | 139 | 1.0 | | |
| | First birefringent layer | NB | 0 | 80 | 106 | 1.3 | | |
| | First polarizer | | 90 | | | | | |
| Embodiment 4 | Second polarizer | | 0 | | | | 55 | 53 |
| | Second birefringent layer | PMMA | 0 | 55 | −100 | −1.8 | | |
| | Second quarter-wave plate | NB | 45 | 138 | 185 | 1.3 | | |
| | Third birefringent layer | NB | | 1 | 100 | | | |
| | VA liquid crystal cell | | | | 320 | | | |
| | First quarter-wave plate | NB | 135 | 138 | 185 | 1.3 | | |
| | First birefringent layer | NB | 0 | 55 | 154 | 2.8 | | |
| | First polarizer | | 90 | | | | | |
| Embodiment 5 | Second polarizer | | 0 | | | | 58 | 61 |
| | Second birefringent layer | NM | 0 | 55 | −98 | −1.8 | | |
| | Second quarter-wave plate | NB | 45 | 138 | 139 | 1.0 | | |
| | Third birefringent layer | NB | | 2 | 230 | | | |
| | VA liquid crystal cell | | | | 320 | | | |
| | First quarter-wave plate | NB | 135 | 138 | 139 | 1.0 | | |
| | First birefringent layer | NB | 0 | 55 | 154 | 2.8 | | |
| | First polarizer | | 90 | | | | | |
| Embodiment 6 | Second polarizer | | 0 | | | | 60 | 62 |
| | Second birefringent layer | PMMA | 0 | 55 | −100 | −1.8 | | |
| | Second quarter-wave plate | NB | 45 | 138 | 139 | 1.0 | | |
| | Third birefringent layer | ChLC | | 0 | 229 | | | |
| | VA liquid crystal cell | | | | 320 | | | |
| | First quarter-wave plate | NB | 135 | 138 | 139 | 1.0 | | |
| | First birefringent layer | NB | 0 | 55 | 154 | 2.8 | | |
| | First polarizer | | 90 | | | | | |
| Embodiment 7 | Second polarizer | | 0 | | | | 60 | 63 |
| | Second birefringent layer | PMMA | 0 | 55 | −100 | −1.8 | | |
| | Second quarter-wave plate | NB | 45 | 138 | 139 | 1.0 | | |
| | Third birefringent layer | PI | | 0 | 230 | | | |
| | VA liquid crystal cell | | | | 320 | | | |
| | First quarter-wave plate | NB | 135 | 138 | 139 | 1.0 | | |
| | First birefringent layer | NB | 0 | 55 | 154 | 2.8 | | |
| | First polarizer | | 90 | | | | | |

TABLE 5

| | Optical components | Material | Angle [°] | Retardation [nm] Rxy | Retardation [nm] Rxz or Rlc | Nz coefficient | Evaluation results CR (45, 60) | Evaluation results CR (0, 60) |
|---|---|---|---|---|---|---|---|---|
| Embodiment 8 | Second polarizer | | 0 | | | | 53 | 25 |
| | Second birefringent layer | PMMA | 0 | 55 | −100 | −1.8 | | |
| | Second quarter-wave plate | NB | 45 | 138 | 221 | 1.6 | | |
| | VA liquid crystal cell | | | | 320 | | | |
| | First quarter-wave plate | NB | 135 | 138 | 221 | 1.6 | | |

TABLE 5-continued

| | Optical components | Material | Angle [°] | Retardation [nm] | | Nz coefficient | Evaluation results | |
| --- | --- | --- | --- | --- | --- | --- | --- | --- |
| | | | | Rxy | Rxz or Rlc | | CR (45, 60) | CR (0, 60) |
| | First birefringent layer | NB | 0 | 55 | 154 | 2.8 | | |
| | First polarizer | | 90 | | | | | |

TABLE 6

| | Optical components | Material | Angle [°] | Retardation [nm] | | Nz coefficient | Evaluation results | |
| --- | --- | --- | --- | --- | --- | --- | --- | --- |
| | | | | Rxy | Rxz or Rlc | | CR (45, 60) | CR (0, 60) |
| Embodiment 9 | Second polarizer | | 0 | | | | 65 | 170 |
| | Second birefringent layer | PMMA | 0 | 55 | −100 | −1.8 | | |
| | Second quarter-wave plate | PMMA | 45 | 138 | −8 | −0.1 | | |
| | Third birefringent layer | NB | | 2 | 318 | | | |
| | VA liquid crystal cell | | | | 320 | | | |
| | First quarter-wave plate | NB | 135 | 138 | 139 | 1.0 | | |
| | First birefringent layer | NB | 0 | 55 | 154 | 2.8 | | |
| | First polarizer | | 90 | | | | | |
| Embodiment 10 | Second polarizer | | 0 | | | | 66 | 168 |
| | Second birefringent layer | NM | 0 | 55 | −98 | −1.8 | | |
| | Second quarter-wave plate | NM | 45 | 138 | −8 | −0.1 | | |
| | Third birefringent layer | NB | | 2 | 318 | | | |
| | VA liquid crystal cell | | | | 320 | | | |
| | First quarter-wave plate | NB | 135 | 138 | 139 | 1.0 | | |
| | First birefringent layer | NB | 0 | 55 | 154 | 2.8 | | |
| | First polarizer | | 90 | | | | | |
| Embodiment 11 | Second polarizer | | 0 | | | | 66 | 172 |
| | Second birefringent layer | PMMA | 0 | 55 | −100 | −1.8 | | |
| | Second quarter-wave plate | PMMA | 45 | 138 | −8 | −0.1 | | |
| | Third birefringent layer | PI | | 0 | 322 | | | |
| | VA liquid crystal cell | | | | 320 | | | |
| | First quarter-wave plate | NB | 135 | 138 | 139 | 1.0 | | |
| | First birefringent layer | NB | 0 | 55 | 154 | 2.8 | | |
| | First polarizer | | 90 | | | | | |

TABLE 7

| | Optical components | Material | Angle [°] | Retardation [nm] | | Nz coefficient | Evaluation results | |
| --- | --- | --- | --- | --- | --- | --- | --- | --- |
| | | | | Rxy | Rxz or Rlc | | CR (45, 60) | CR (0, 60) |
| Embodiment 12 | Second polarizer | | 0 | | | | 61 | 65 |
| | Second birefringent layer | PMMA | 0 | 55 | −100 | −1.8 | | |
| | Second quarter-wave plate | NB | 45 | 138 | 139 | 1.0 | | |
| | Third birefringent layer | PI | | 0 | 115 | | | |
| | VA liquid crystal cell | | | | 320 | | | |
| | Third birefringent layer | PI | | 0 | 115 | | | |
| | First quarter-wave plate | NB | 135 | 138 | 139 | 1.0 | | |
| | First birefringent layer | NB | 0 | 55 | 154 | 2.8 | | |
| | First polarizer | | 90 | | | | | |
| Embodiment 13 | Second polarizer | | 0 | | | | 66 | 172 |
| | Second birefringent layer | PMMA | 0 | 55 | −100 | −1.8 | | |
| | Second quarter-wave plate | PMMA | 45 | 138 | −8 | −0.1 | | |
| | Third birefringent layer | PI | | 0 | 160 | | | |
| | VA liquid crystal cell | | | | 320 | | | |
| | Third birefringent layer | PI | | 0 | 160 | | | |
| | First quarter-wave plate | NB | 135 | 138 | 139 | 1.0 | | |
| | First birefringent layer | NB | 0 | 55 | 154 | 2.8 | | |
| | First polarizer | | 90 | | | | | |

TABLE 8

| | Optical components | Material | Angle [°] | Retardation [nm] Rxy | Retardation [nm] Rxz or Rlc | Nz coefficient | Evaluation results CR (45, 60) | Evaluation results CR (0, 60) |
|---|---|---|---|---|---|---|---|---|
| Comparative Embodiment 1 | Second polarizer | | −20 | | | | 5 | 40 |
| | TAC | TAC | | 1 | 32 | | | |
| | Second quarter-wave plate | NB | 25 | 138 | 216 | 1.6 | | |
| | VA liquid crystal cell | | | | 320 | | | |
| | First quarter-wave plate | NB | 115 | 138 | 216 | 1.6 | | |
| | TAC | TAC | | 1 | 32 | | | |
| | First polarizer | | 70 | | | | | |
| Comparative Embodiment 2 | Second polarizer | | 0 | | | | 15 | 140 |
| | TAC | TAC | | 1 | 32 | | | |
| | Second quarter-wave plate | PMMA | 45 | 138 | −8 | −0.1 | | |
| | Third birefringent layer | NB | | 2 | 318 | | | |
| | VA liquid crystal cell | | | | 320 | | | |
| | First quarter-wave plate | NB | 135 | 138 | 139 | 1.0 | | |
| | TAC | TAC | 90 | 1 | 32 | | | |
| | First polarizer | | | | | | | |
| Comparative Embodiment 3 | Second polarizer | | 0 | | | | 70 | 177 |
| | Isotropic film | Z | | | | | | |
| | Second quarter-wave plate | PMMA | 45 | 138 | 70 | 0.5 | | |
| | Third birefringent layer | NB | | | 318 | | | |
| | VA liquid crystal cell | | | 2 | 320 | | | |
| | First quarter-wave plate | NB | 135 | 138 | 70 | 0.5 | | |
| | HWP | | 0 | 275 | 138 | 0.5 | | |
| | Isotropic film | Z | 90 | | | | | |
| | First polarizer | | | | | | | |

TABLE 9

| | Optical components | Material | Angle [°] | Retardation [nm] Rxy | Retardation [nm] Rxz or Rlc | Nz coefficient | Evaluation results CR (45, 60) | Evaluation results CR (0, 60) |
|---|---|---|---|---|---|---|---|---|
| Comparative Embodiment 4 | Second polarizer | | 0 | | | | 81 | 272 |
| | Second biaxial retardation film | NB | 90 | 55 | 152 | 2.8 | | |
| | VA liquid crystal cell | | | | 320 | | | |
| | First biaxial retardation film | NB | 0 | 55 | 152 | 2.8 | | |
| | First polarizer | | 90 | | | | | |
| Comparative Embodiment 5 | Second polarizer | | 0 | | | | 78 | 270 |
| | Second biaxial retardation film | NB | 90 | 61 | 120 | 2.0 | | |
| | VA liquid crystal cell | | | | 290 | | | |
| | First biaxial retardation film | NB | 0 | 61 | 120 | 2.0 | | |
| | First polarizer | | 90 | | | | | |
| Comparative Embodiment 6 | Second polarizer | | 0 | | | | 78 | 265 |
| | Second biaxial retardation film | NB | 90 | 50 | 198 | 4.0 | | |
| | VA liquid crystal cell | | | | 370 | | | |
| | First biaxial retardation film | NB | 0 | 50 | 198 | 4.0 | | |
| | First polarizer | | 90 | | | | | |

The present application claims priority to Patent Application No. 2008-99526 filed in Japan on Apr. 7, 2008 under the Paris Convention and provisions of national law in a designated State, the entire contents of which are hereby incorporated by reference.

BRIEF DESCRIPTION OF THE DRAWINGS

FIG. 1(a) is a view from the front direction; and
FIG. 1(b) is a view from an oblique direction.

FIG. 2(a) is a view from the front direction; and
FIG. 2(b) is a view from an oblique direction.

FIG. 7(a) is a view that shows the polarization states projected on S1-S2 plane;

FIG. 7(b) is a view that shows the polarization states projected on S1-S3 plane.

FIG. 9(a) is a view that shows the polarization states projected on S1-S2 plane;

FIG. 9(b) is a view that shows the polarization states projected on S1-S3 plane.

EXPLANATION OF SYMBOLS

Figure 1:
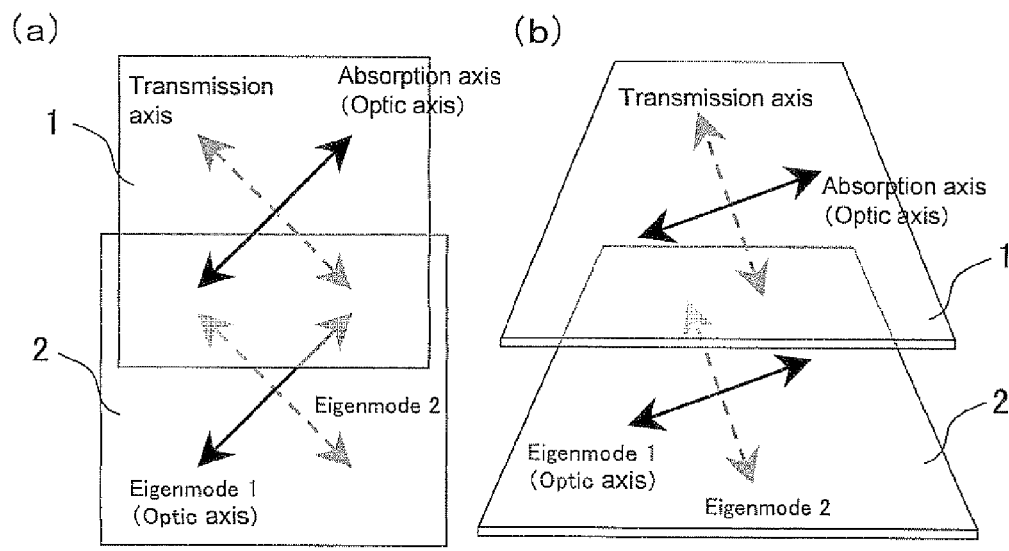
FIG. 1 is a view that shows an axial relationship between a birefringent layer and a polarizer when the birefringent layer and the polarizer are disposed so that the optic axes thereof are parallel to each other as viewed in the front direction.
Figure 2:
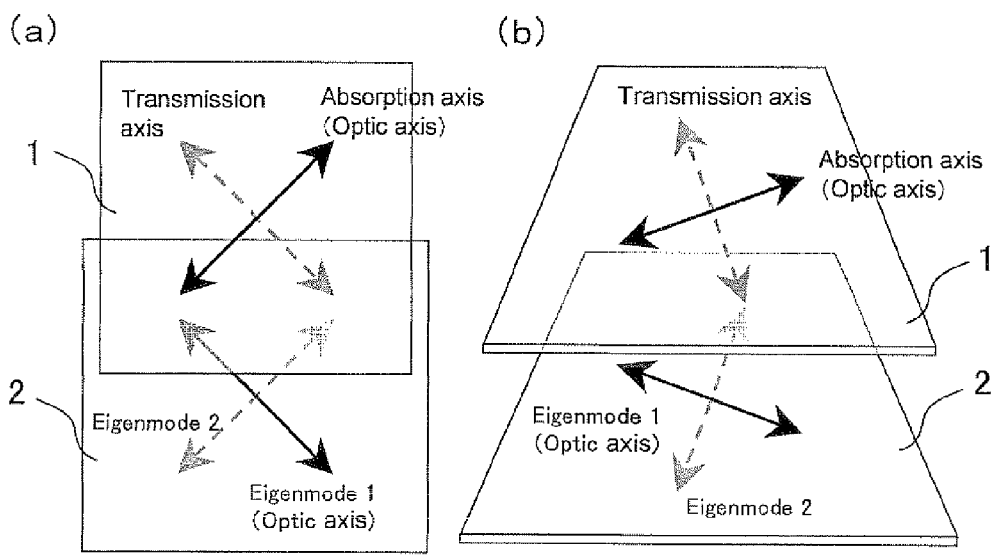
FIG. 2 is a view that shows an axial relationship between a birefringent layer and a polarizer when the birefringent layer and the polarizer are disposed so that the optic axes thereof are orthogonal to each other as viewed in the front direction.
Figure 3:
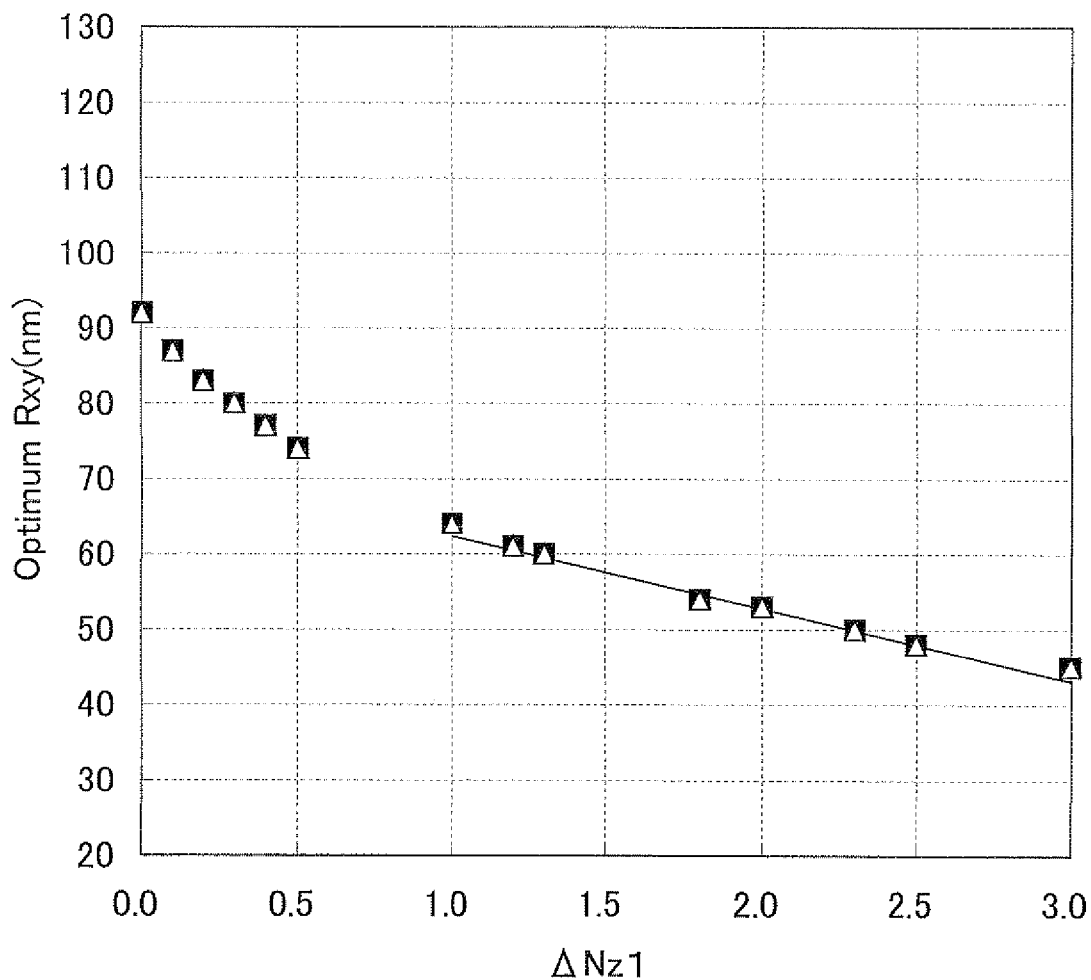
FIG. 3 is a graph that shows a relationship between $\Delta Nz1$ of a first birefringent layer and an optimum Rxy in the case of $\Delta Nz1=\Delta Nz2$. "■" represents the first birefringent layer, and "Δ" represents a second birefringent layer.
Figure 4:
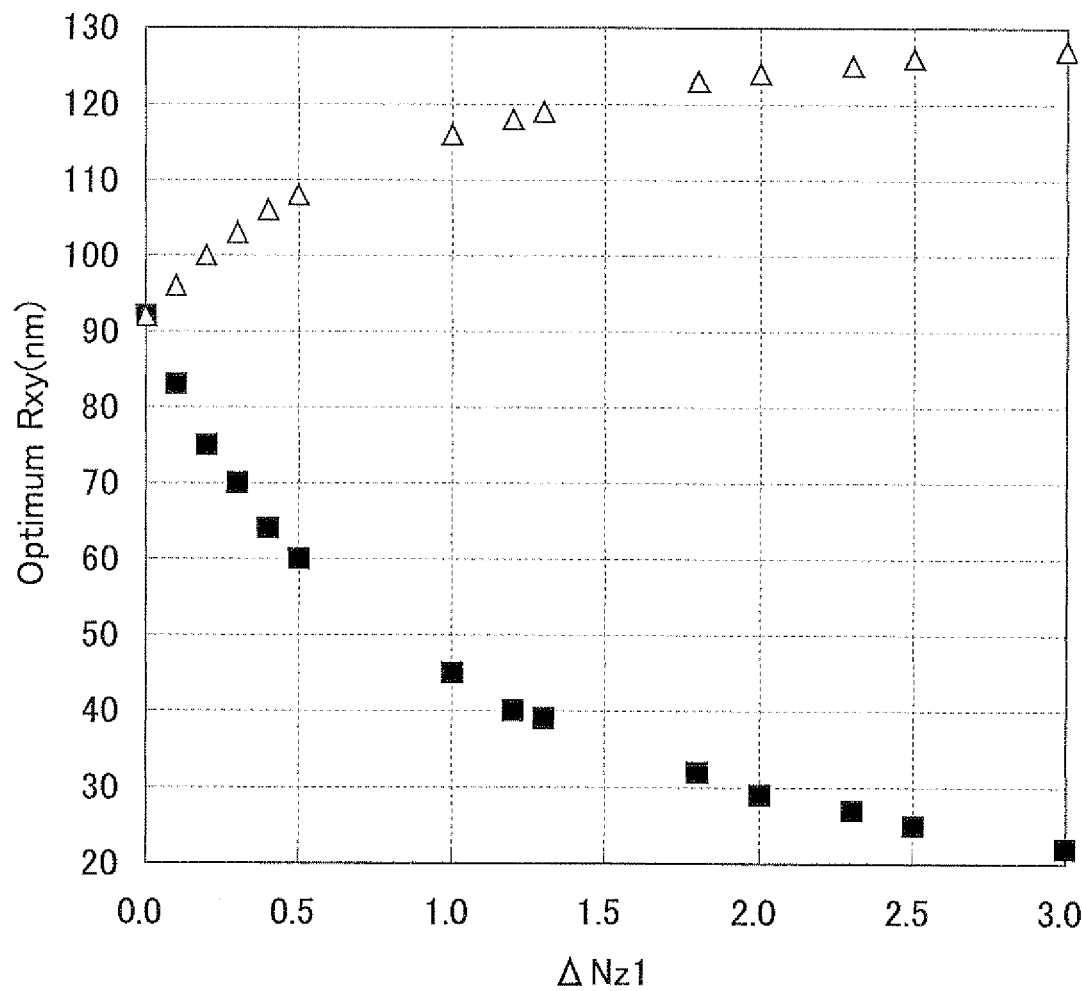
FIG. 4 is a graph that shows a relationship between $\Delta Nz2$ and an optimum Rxy in the case of $\Delta Nz1=0$ and $\Delta Nz2>0$. "■" represents the first birefringent layer, and "Δ" represents the second birefringent layer.
Figure 5:
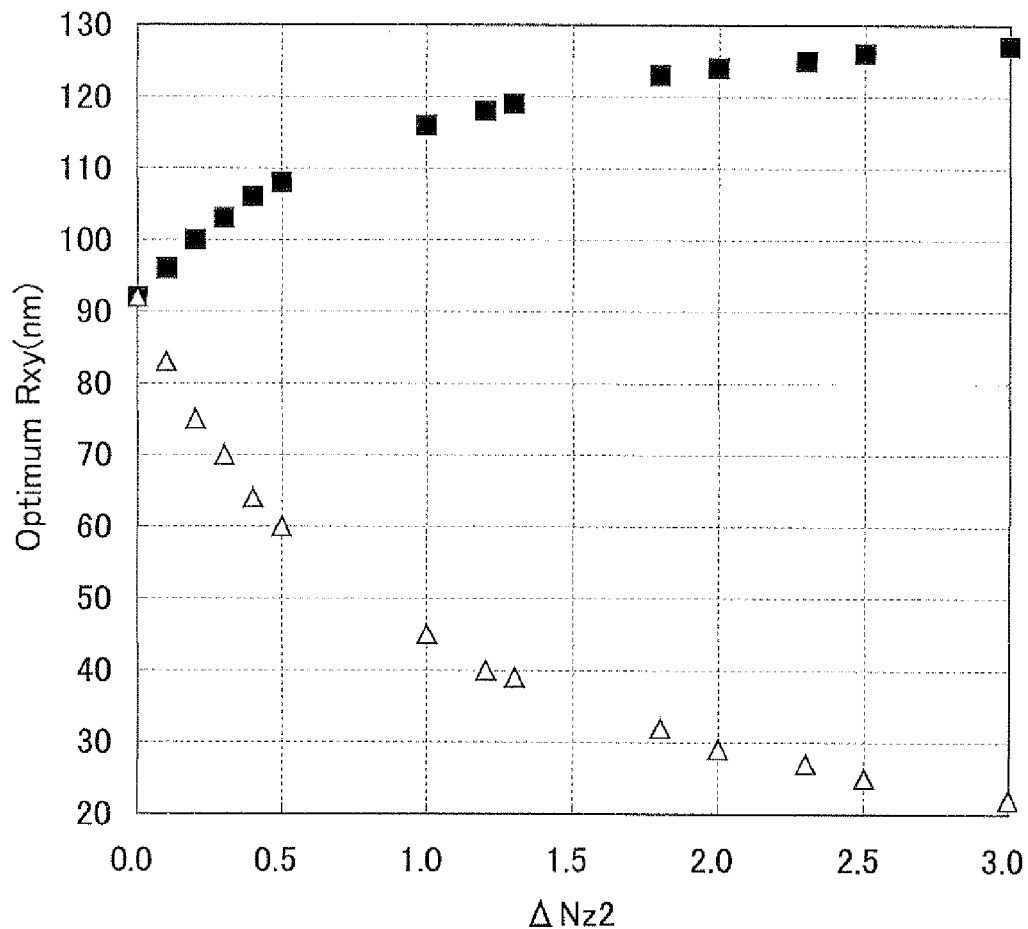
FIG. 5 is a graph that shows a relationship between $\Delta Nz1$ and an optimum Rxy in the case of $\Delta Nz2=0$ and $\Delta Nz1>0$. "■" represents the first birefringent layer, and "Δ" represents the second birefringent layer.
Figure 6:
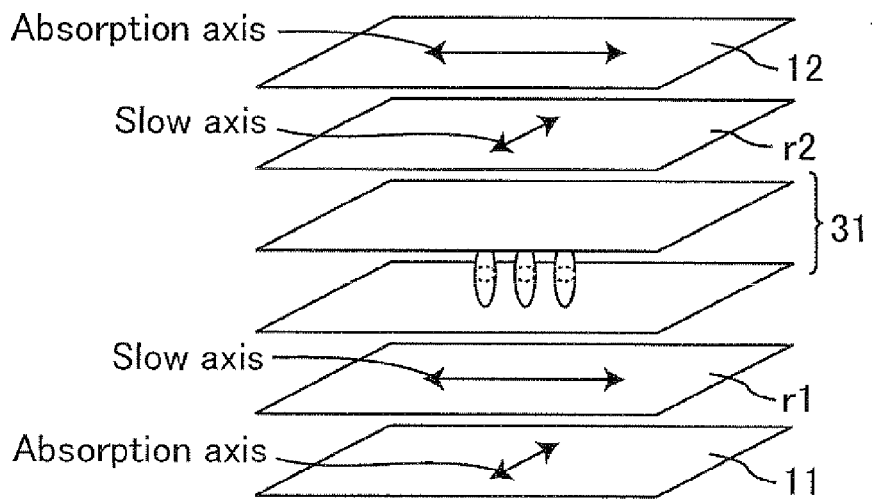
FIG. 6 is a view that schematically shows a linear polarization VA LCD device including two biaxial retardation films for optical compensation.
Figure 7:
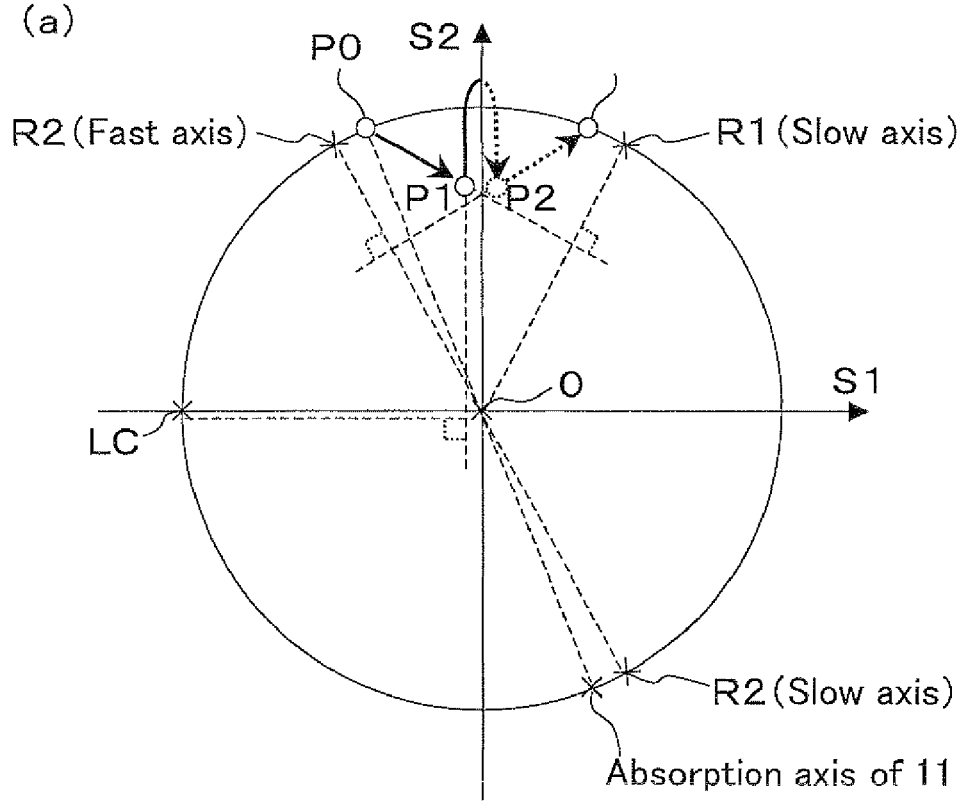
FIG. 7 is a Poincare sphere diagram showing changes in polarization state of a light beam propagating through the LCD device in FIG. 6.
Figure 7:
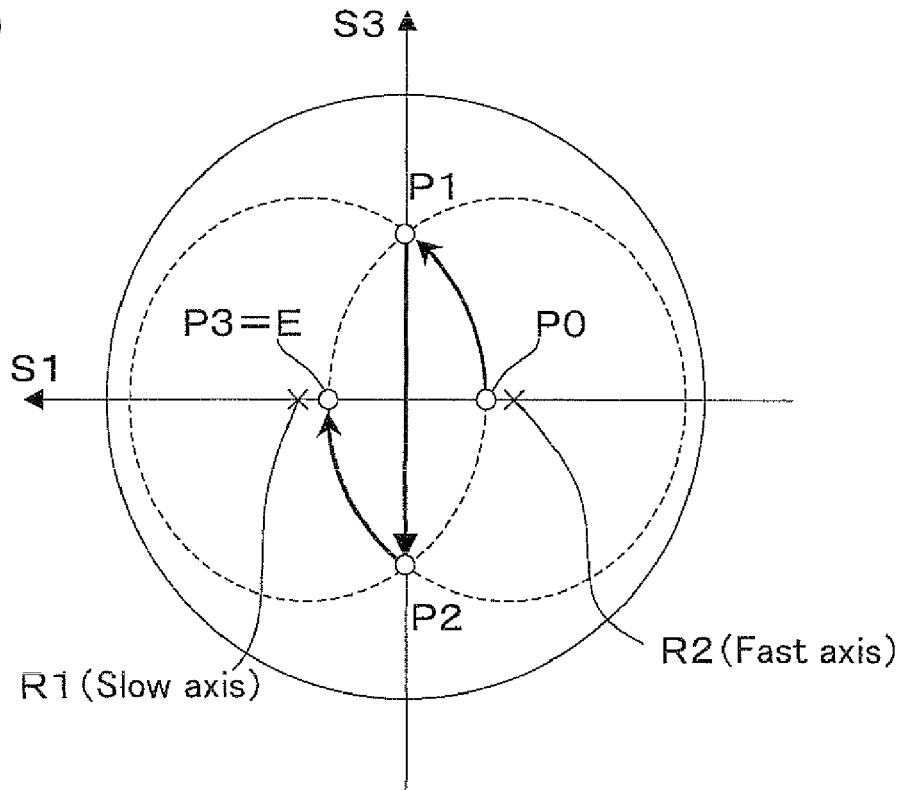
Figure 8:
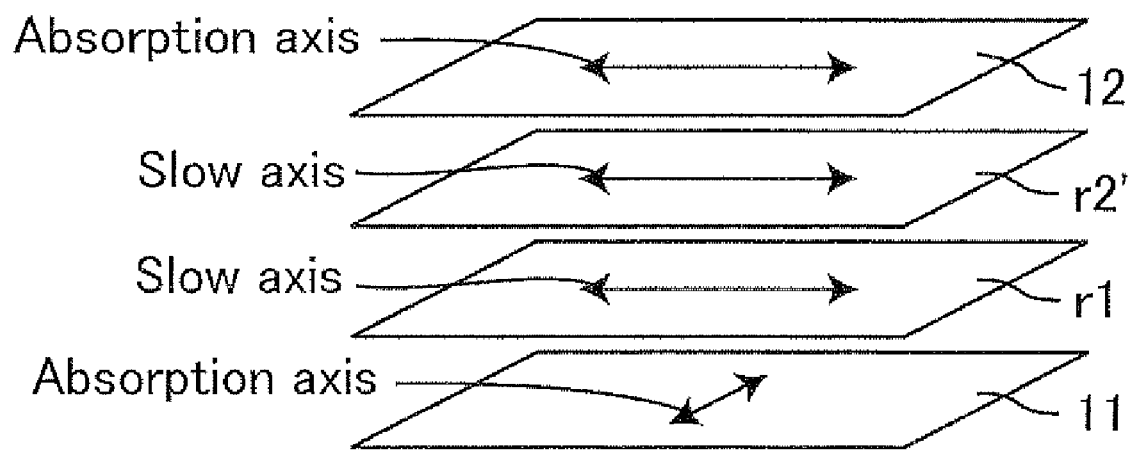
FIG. 8 is a view that schematically shows a multi-layer body where the orthogonality between first and second polarizers is optically compensated by use of two biaxial retardation films when viewed in a direction with an azimuth angle of 45° and an inclination angle of 60°.
Figure 9:
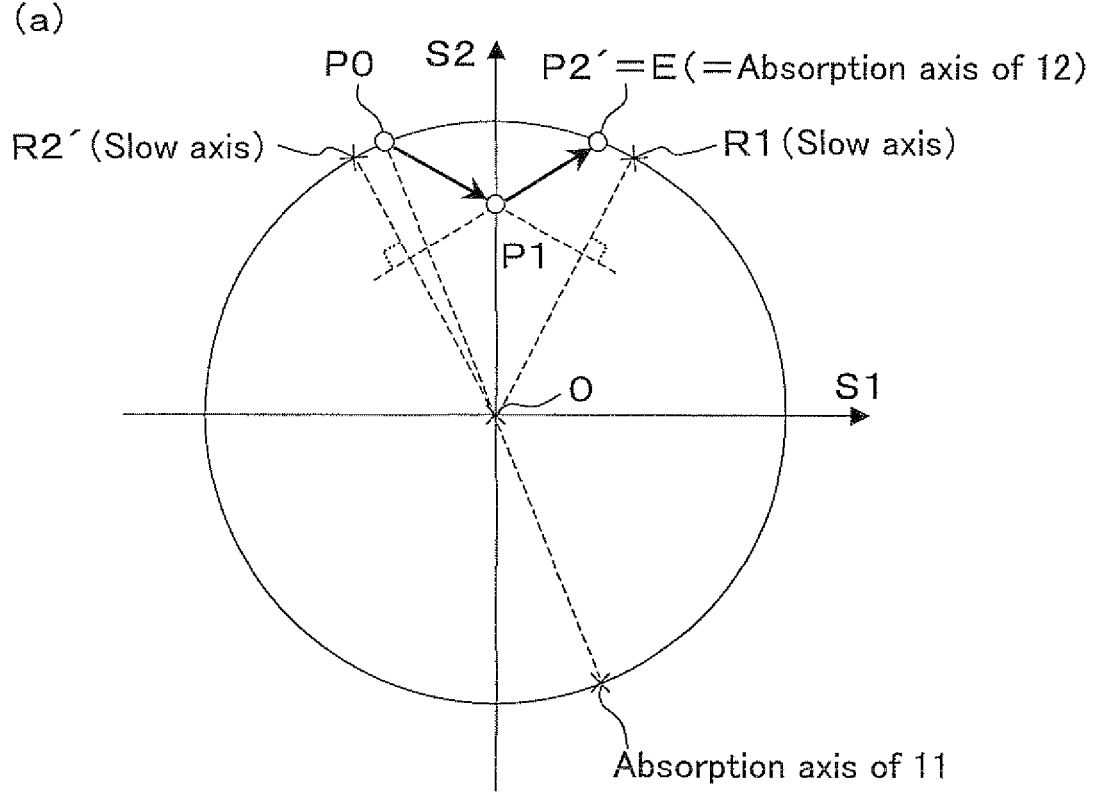
FIG. 9 is a Poincare sphere diagram showing changes in polarization state of a light beam propagating through the multi-layer body in FIG. 8.
Figure 9:
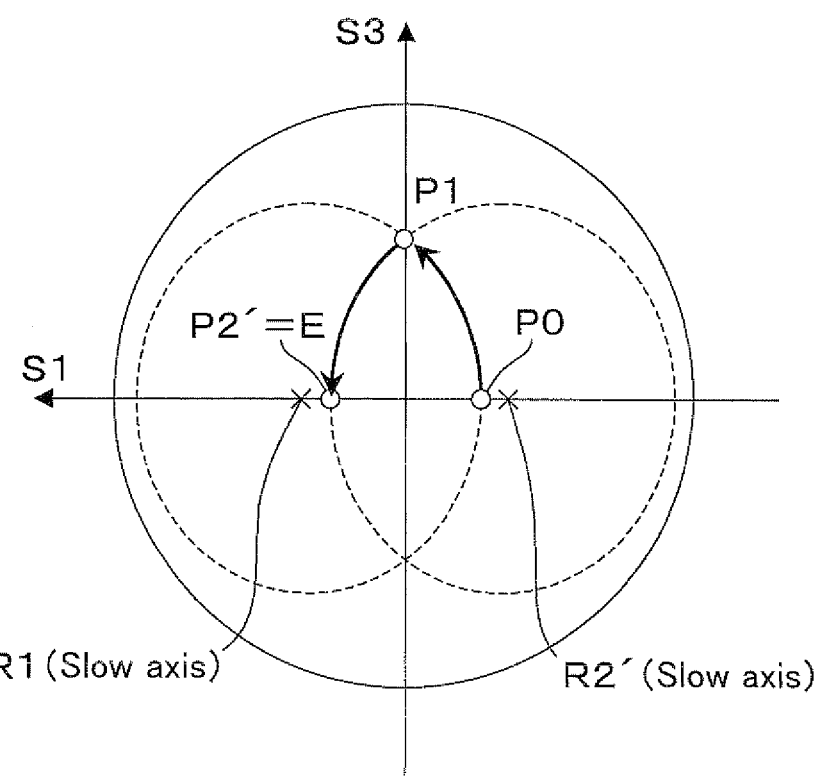
Figure 10:
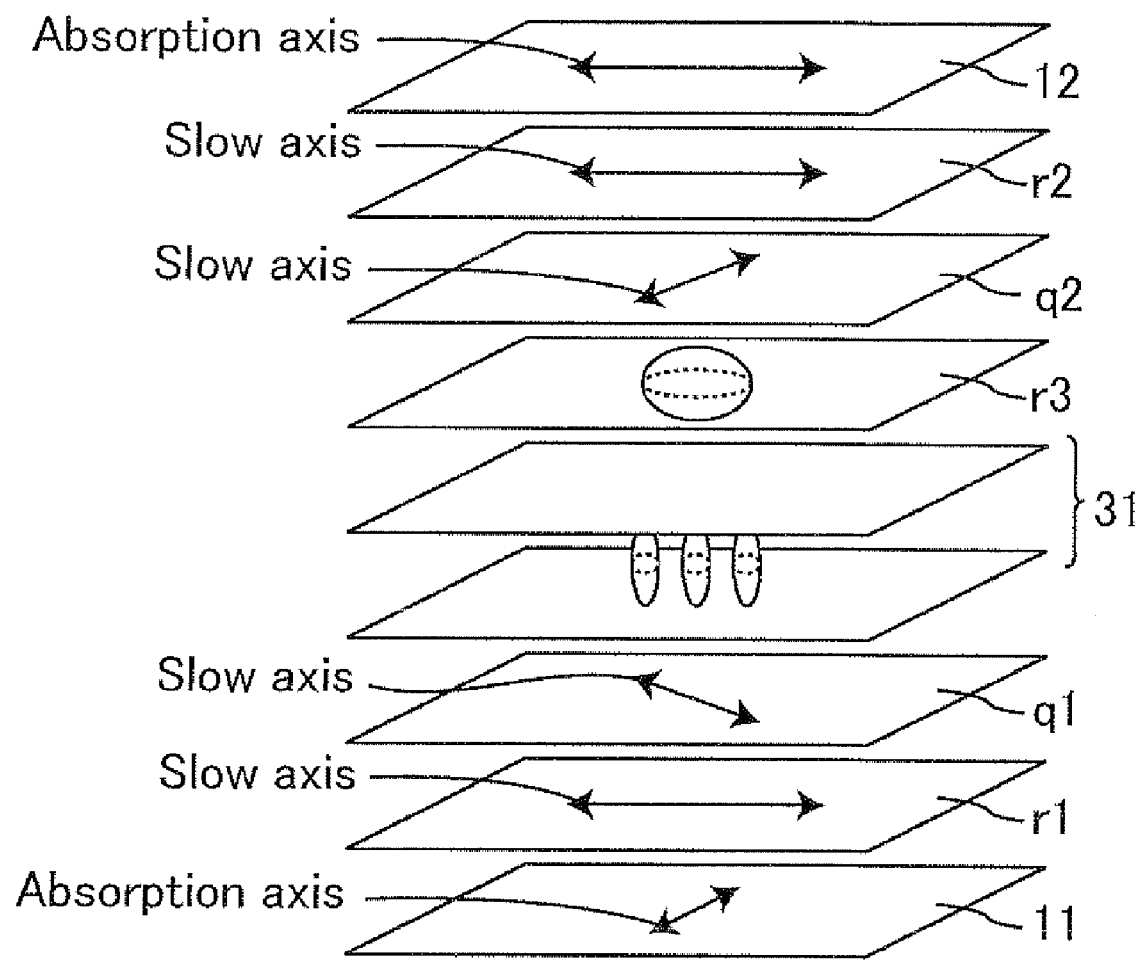
FIG. 10 is a view that schematically shows a structure of an LCD device in accordance with one example of the present invention.
Figure 11:
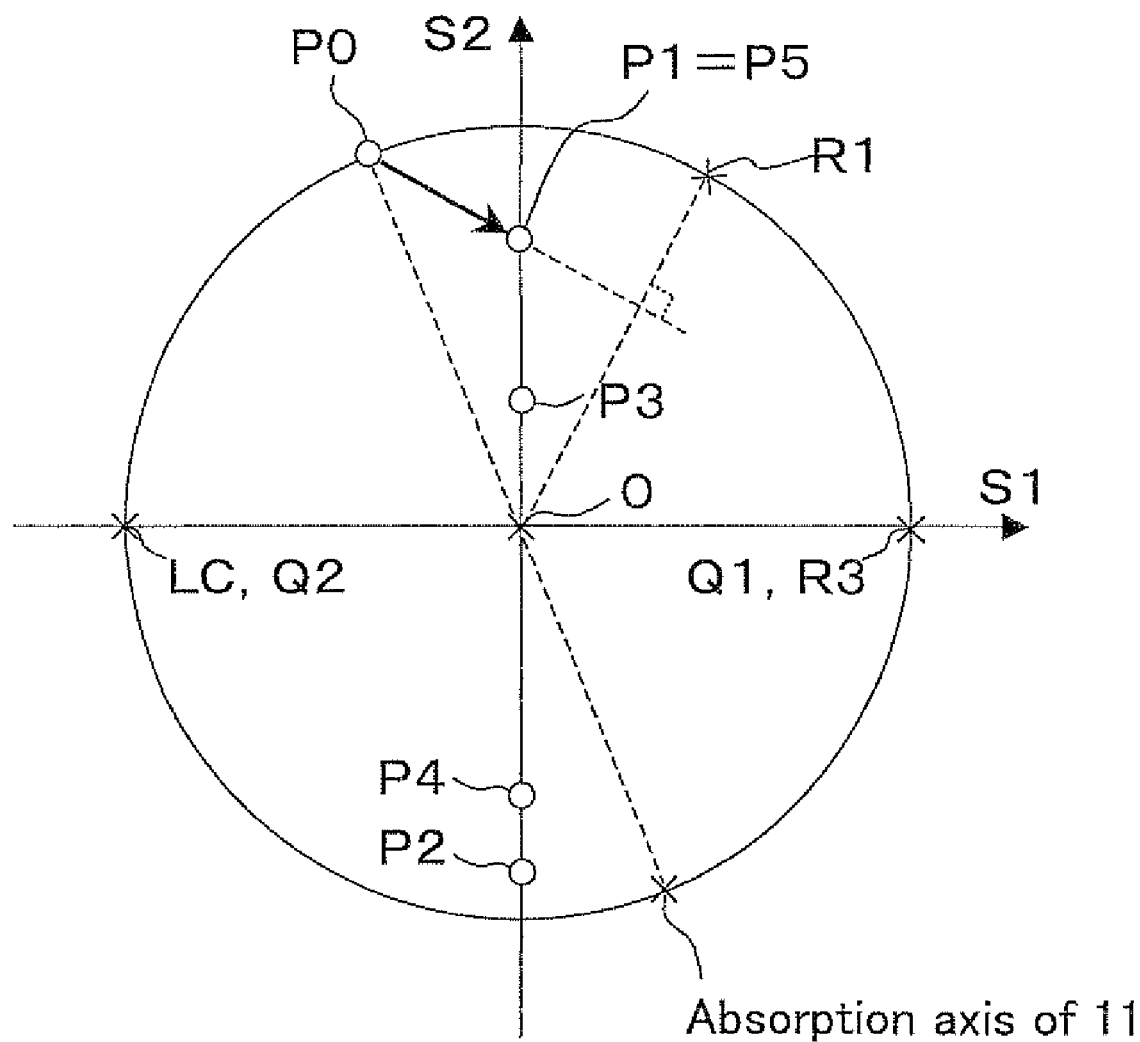
FIG. 11 is a view where changes in polarization state of a light beam propagating through the LCD device (Rlc=320 nm, Nzq1=Nzq2=1.0) in FIG. 10 when viewed from a direction with an azimuth angle of 45° and an inclination angle of 60° are projected on S1-S2 plane of the Poincare sphere.
Figure 12:
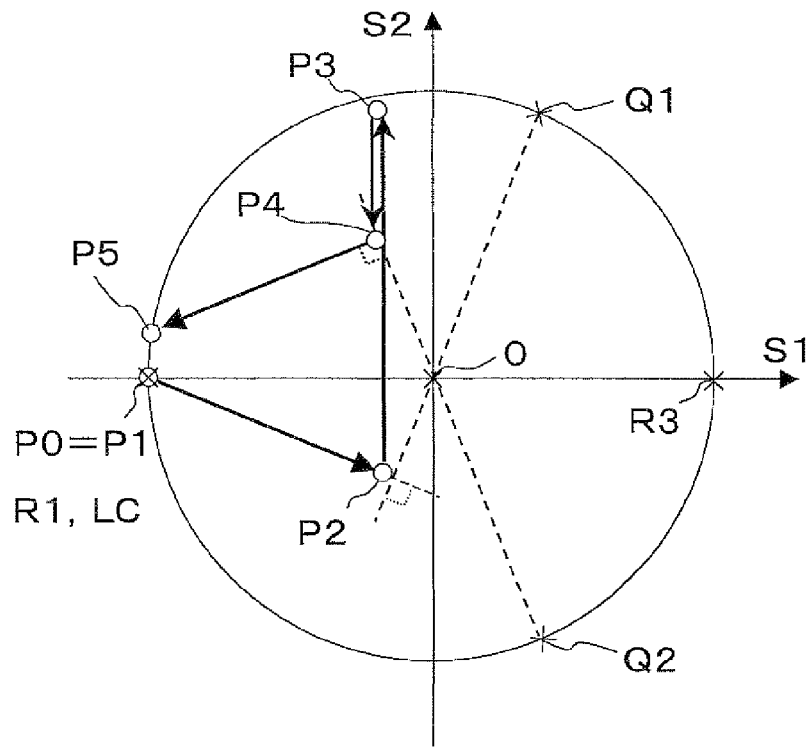
FIG. 12 is a view where changes in polarization state of a light beam propagating through the LCD device (Rlc=320 nm, Nzq1=Nzq2=1.0) in FIG. 10 when viewed from a direction with an azimuth angle of 0° and an inclination angle of 60° are projected on S1-S2 plane of the Poincare sphere.
Figure 13:
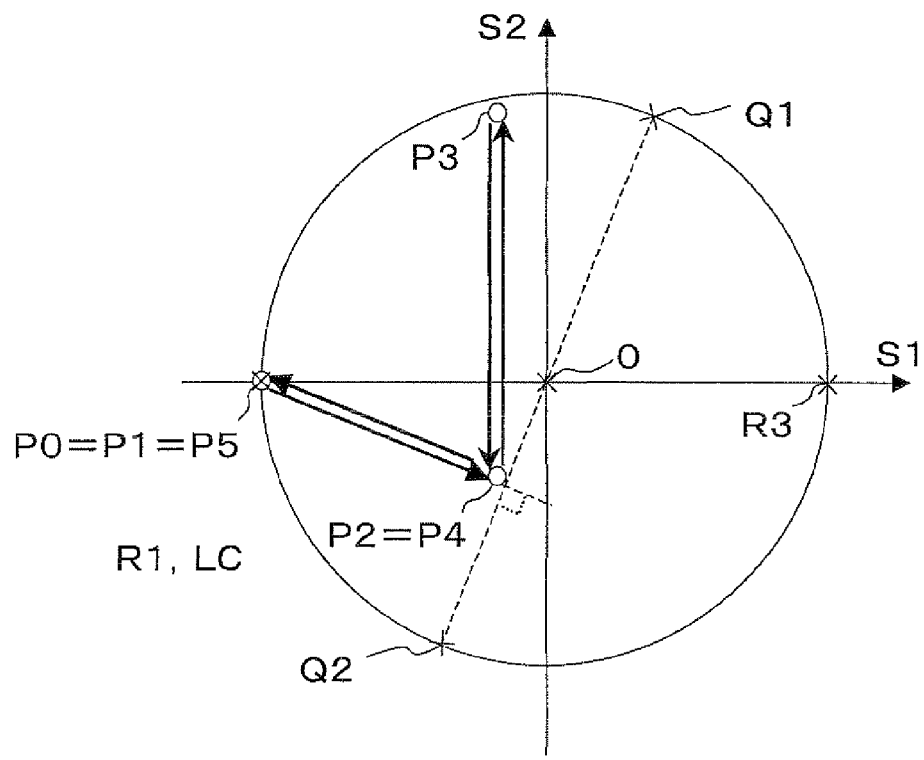
FIG. 13 is a view where changes in polarization state of a light beam propagating through the LCD device (Rlc=320 nm, Nzq1=1.0, Nzq2=0.0) in FIG. 10 when viewed from a direction with an azimuth angle of 0° and an inclination angle of 60° are projected on S1-S2 plane of the Poincare sphere.
Figure 14:
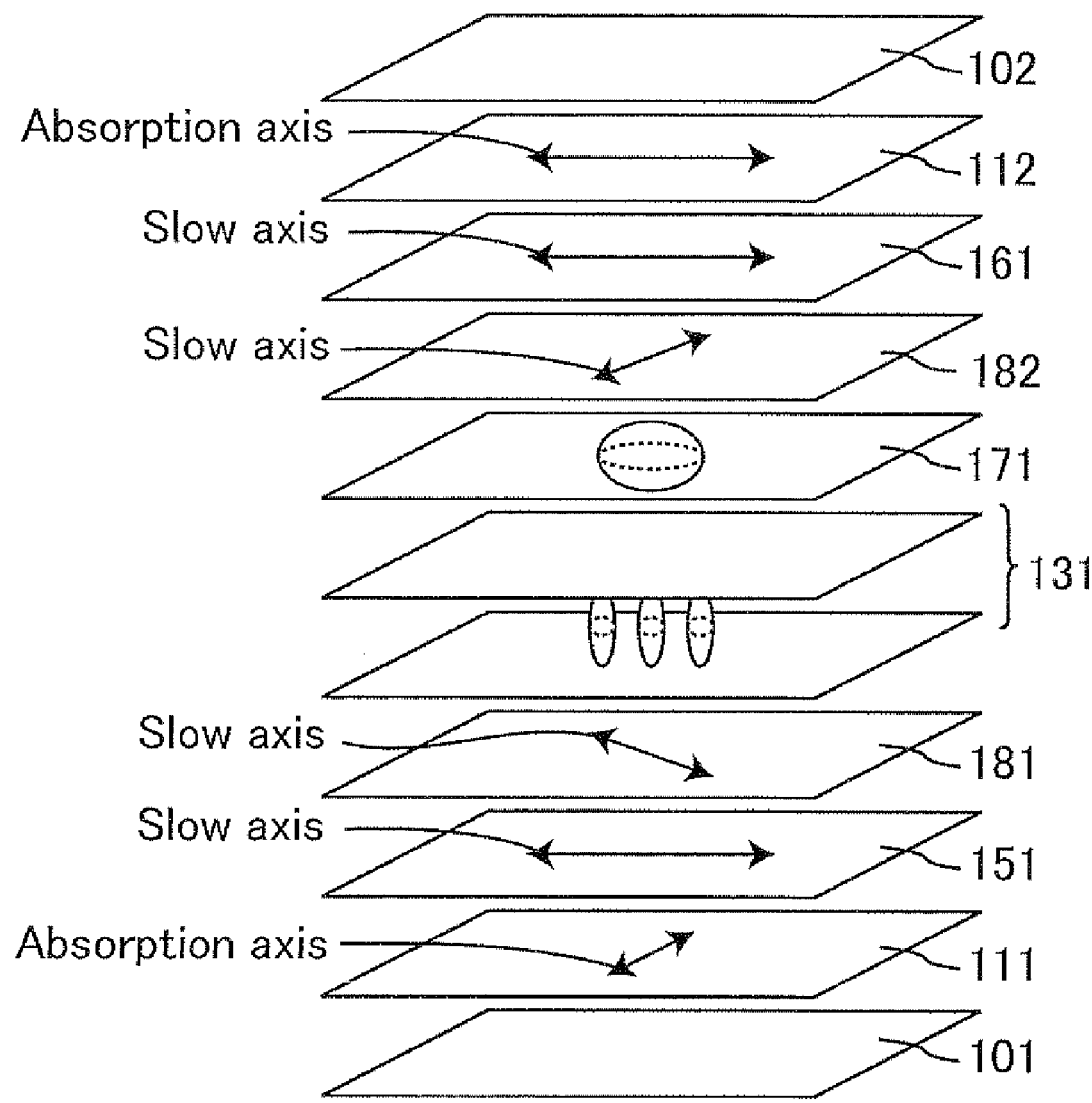
FIG. 14 is a schematic view showing a structure of an LCD device of Embodiment 1.
Figure 15:
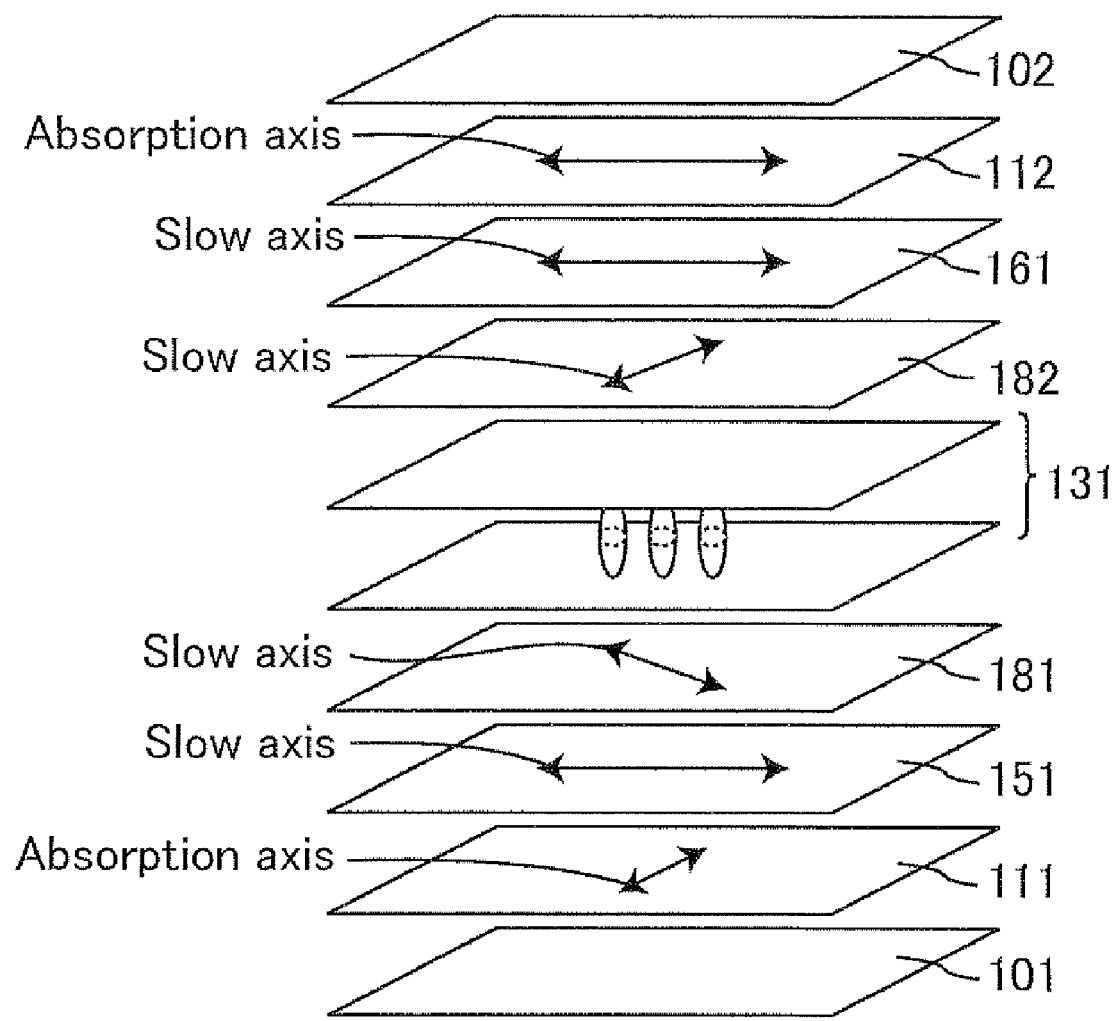
FIG. 15 is a schematic view showing a structure of an LCD device of Embodiment 8.
Figure 16:
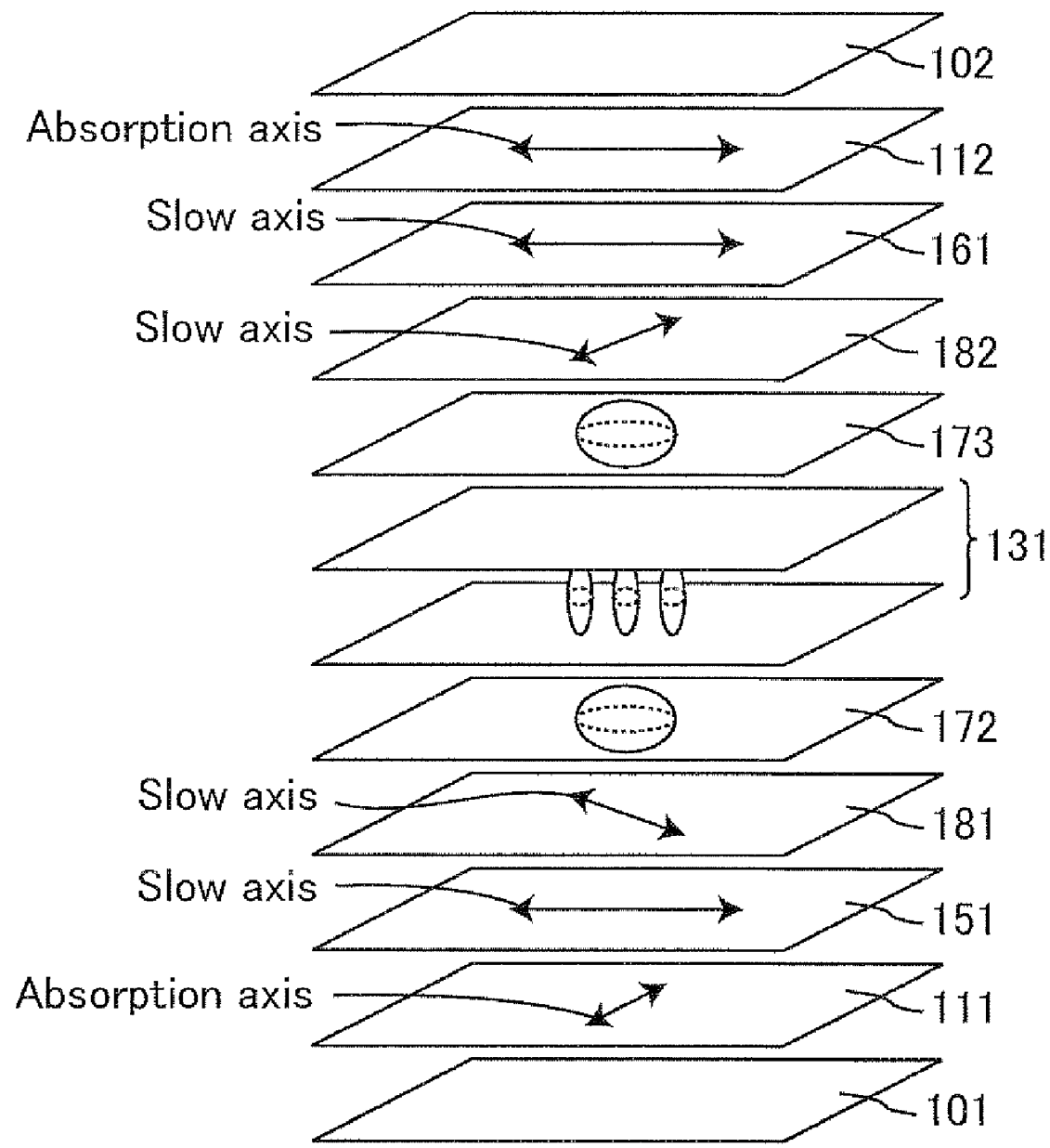
FIG. 16 is a schematic view showing a structure of an LCD device of Embodiment 12.
Figure 17:
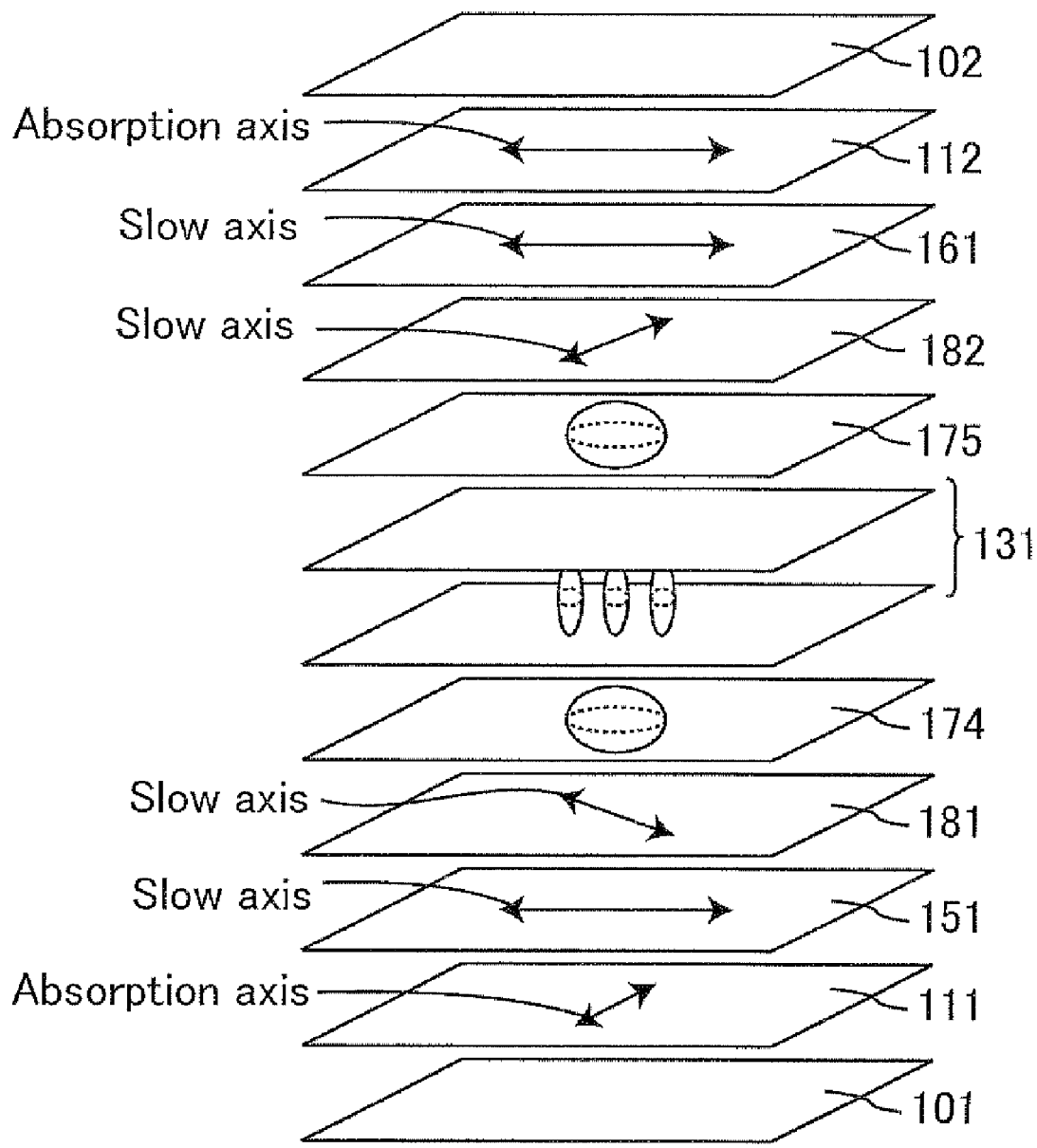
FIG. 17 is a schematic view showing a structure of an LCD device of Embodiment 13.
Figure 18:
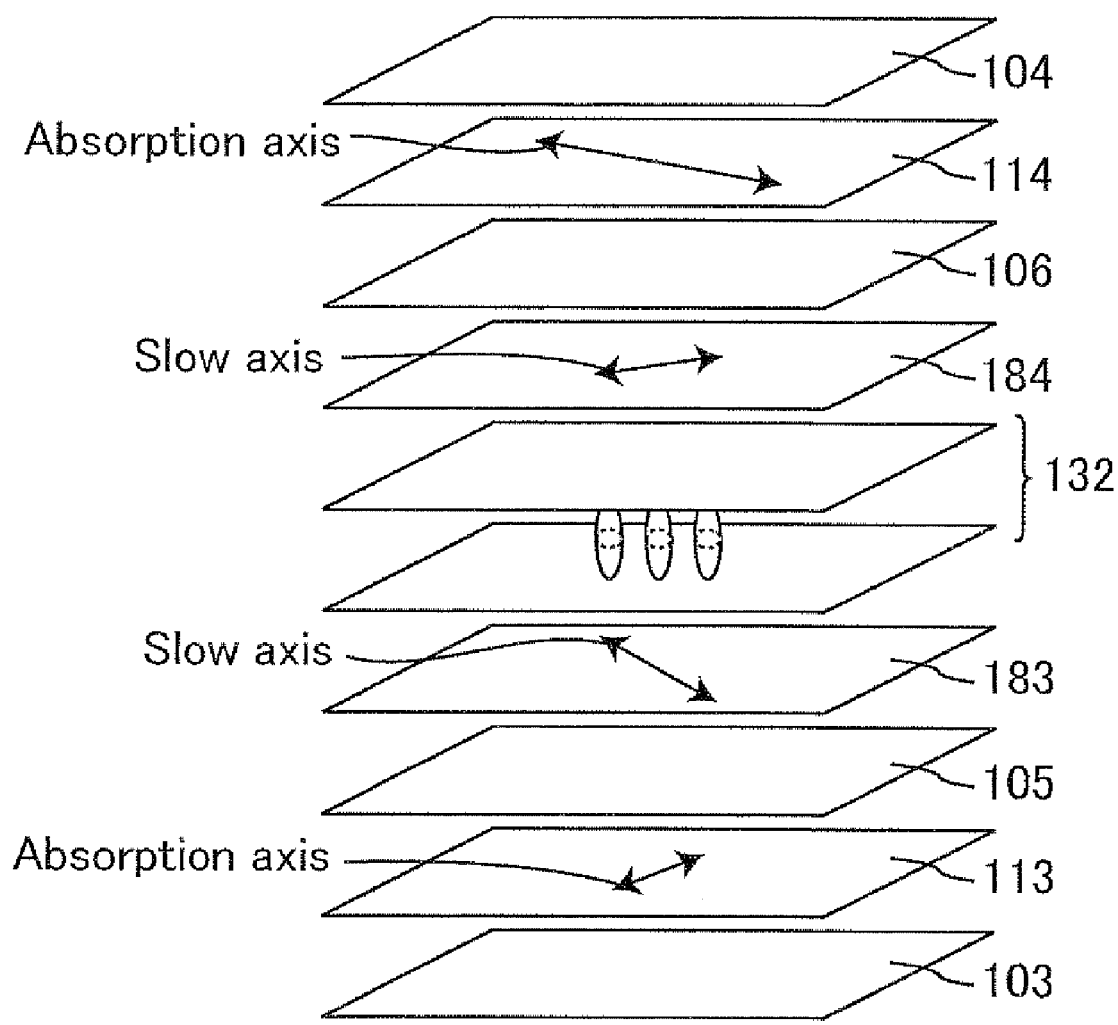
FIG. 18 is a schematic view showing a structure of an LCD device of Comparative Embodiment 1.
Figure 19:
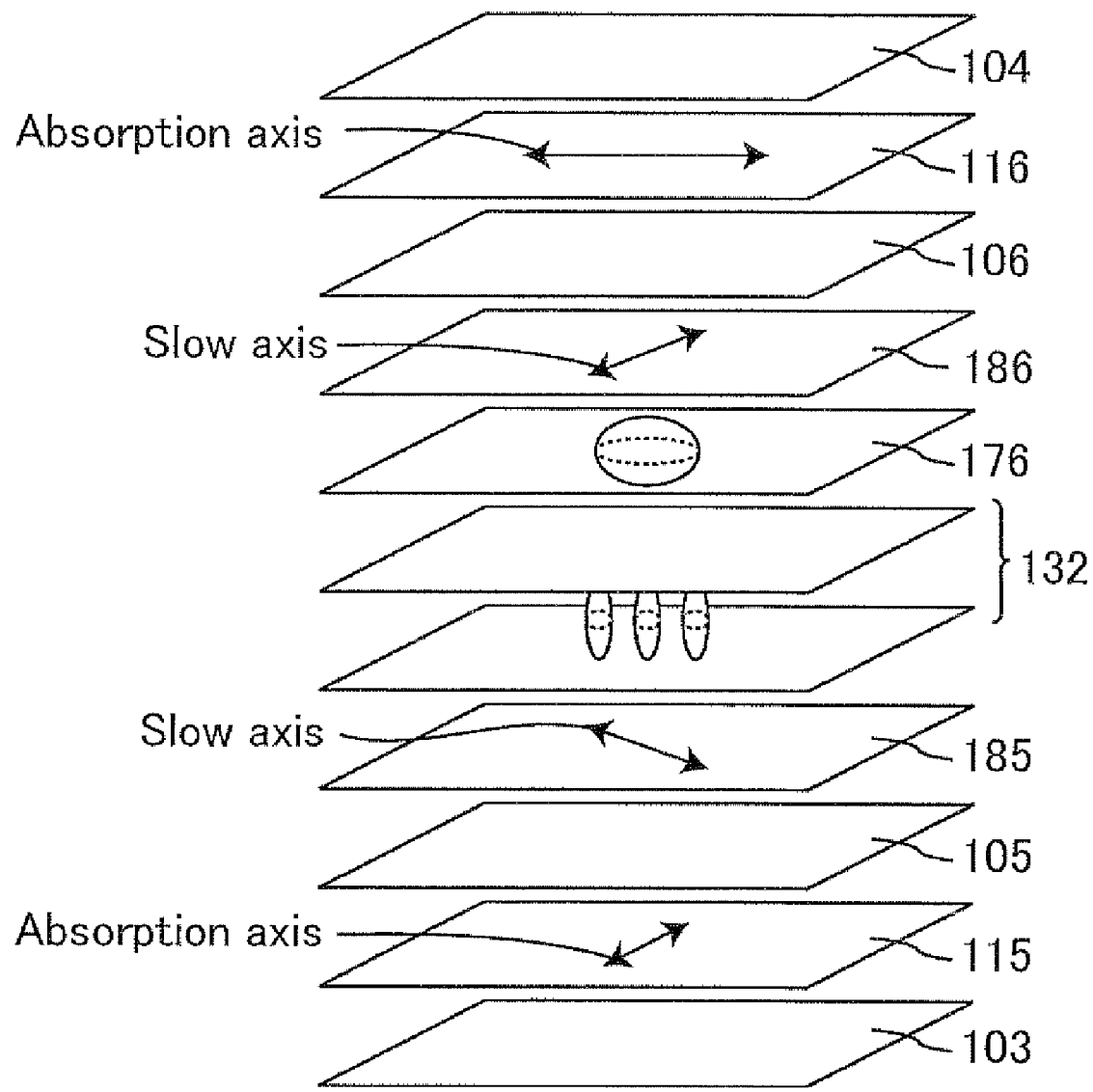
FIG. 19 is a schematic view showing a structure of an LCD device of Comparative Embodiment 2.
Figure 20:
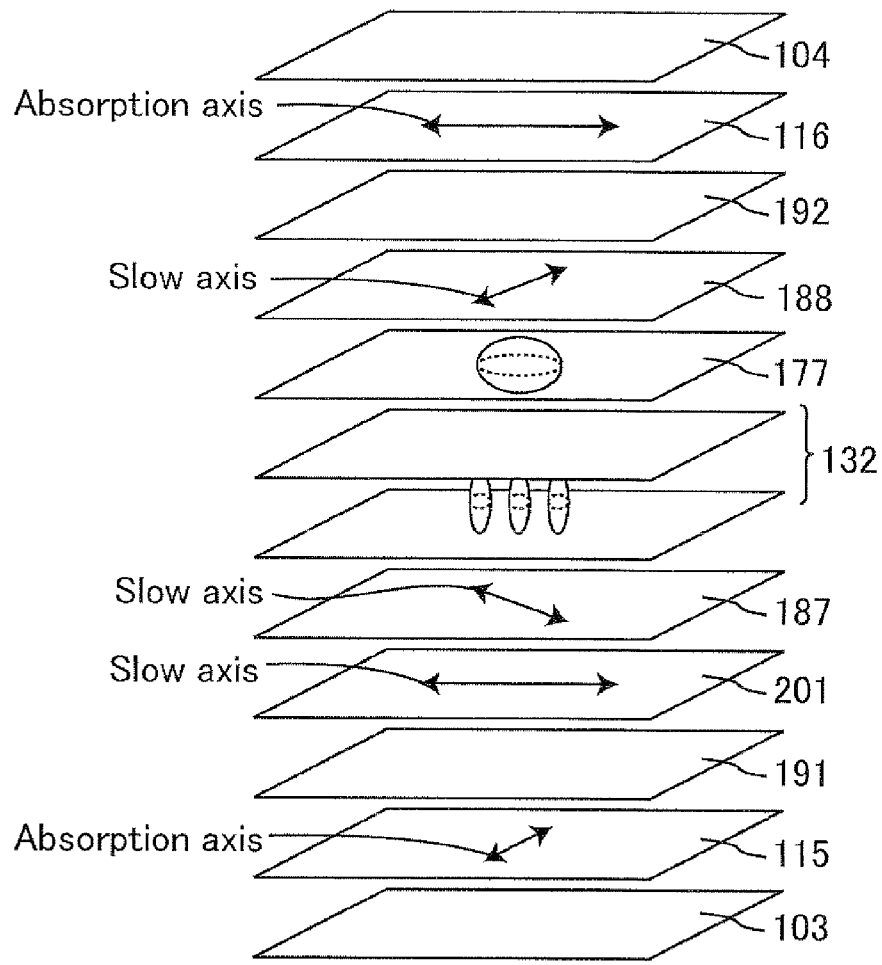
FIG. 20 is a schematic view showing a structure of an LCD device of Comparative Embodiment 3.
Figure 21:
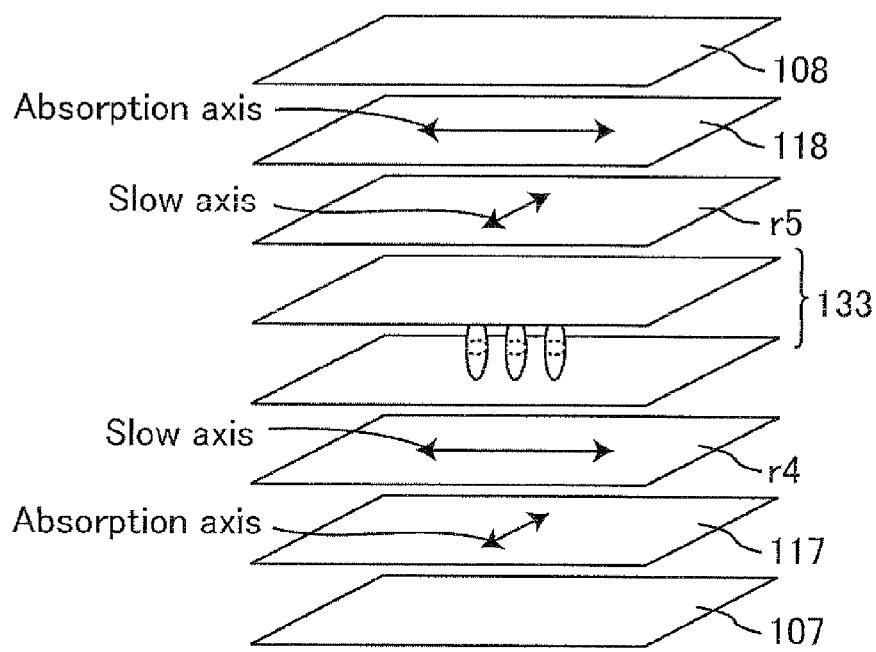
FIG. 21 is a schematic view showing a structure of an LCD device of Comparative Embodiment 4.

1: Polarizer
2: Birefringent layer
11, 111, 113, 115, 117: First polarizer
12, 112, 114, 116, 118: Second polarizer
31, 131, 132, 133: VA LC cell
101, 102, 103, 104, 105, 106, 107, 108: TAC film
151: First birefringent layer
161: Second birefringent layer
171, 172, 173, 174, 175, 176, 177: Third birefringent layer
181, 183, 185, 187, q1: First quarter-wave plate
182, 184, 186, 188, q2: Second quarter-wave plate
191, 192: Isotropic film
201: Half-wave plate
r1, r4: First biaxial retardation film
r2, r2', r5: Second biaxial retardation film
r3: Third birefringent layer

The invention claimed is:

1. A liquid crystal display device, comprising in the following order:
   a first polarizer;
   a first birefringent layer;
   a first quarter-wave plate;
   a liquid crystal cell;
   a second quarter-wave plate;
   a second birefringent layer; and
   a second polarizer having an absorption axis orthogonal to an absorption axis of the first polarizer,
   wherein the first birefringent layer satisfies Nz>0.9 and has an in-plane slow axis orthogonal to the absorption axis of the first polarizer;
   the first quarter-wave plate has an in-plane slow axis forming an angle of about 45° with the absorption axis of the first polarizer;
   the liquid crystal cell displays a black screen by aligning liquid crystal molecules in the liquid crystal cell vertically to a substrate surface;
   the second quarter-wave plate has an in-plane slow axis orthogonal to the in-plane slow axis of the first quarter-wave plate;
   the second birefringent layer satisfies Nz<0.1 and has an in-plane slow axis parallel to the absorption axis of the second polarizer; and
   wherein the first birefringent layer satisfies $2.0 \leq Nz \leq 4.0$ and, in units of nm, $-15+(72-9.6 \times \Delta Nz1) \leq Rxy(nm) \leq 15+(72-9.6 \times \Delta Nz1)$, wherein $\Delta Nz1$ represents a biaxial parameter of the first birefringent layer defined as $|Nz-1|$.

2. The liquid crystal display device according to claim 1, wherein the liquid crystal display device satisfies $|\Delta Nz1 - \Delta Nz2| \leq 0.4$, wherein $\Delta Nz1$ represents a biaxial parameter of the first birefringent layer defined as $|Nz-1|$ and $\Delta Nz2$ represents a biaxial parameter of the second birefringent layer defined as $|Nz|$.

3. The liquid crystal display device according to claim 1, wherein the first birefringent layer satisfies $2.3 \leq Nz \leq 3.3$.

4. The liquid crystal display device according to claim 1, further comprising a third birefringent layer satisfying $Rxy \leq 10$ nm and $Rxz > 0$ nm between the first quarter-wave plate and the liquid crystal cell and/or between the Liquid crystal cell and the second quarter-wave plate.

5. The liquid crystal display device according to claim 4, wherein, in units of nm, the third birefringent layer satisfies $-50+(Rlc(nm)-137.5 \times (Nzq1+Nzq2-1)) \leq Rxz(nm) \leq 50+(Rlc(nm)-137.5 \times (Nzq1+Nzq2-1))$, wherein Rlc represents $|Rxz|$ of the liquid crystal cell; Nzq1 represents an Nz coefficient of the first quarter-wave plate; and Nzq2 represents an Nz coefficient of the second quarter-wave plate.

6. The liquid crystal display device according to claim 1, wherein the first and second quarter-wave plates satisfy $0.8 \leq Nzq1+Nzq2 \leq 1.2$, wherein Nzq1 represents an Nz coefficient of the first quarter-wave plate; and Nzq2 represents an Nz coefficient of the second quarter-wave plate.

7. The liquid crystal display device of claim 1, wherein the liquid crystal cell is a vertical alignment (VA) type liquid crystal cell.

* * * * *